United States Patent [19]
Hibata

[11] Patent Number: 5,495,993
[45] Date of Patent: Mar. 5, 1996

[54] RETRACTOR FOR SEAT BELT

[75] Inventor: Ganta Hibata, Kanagawa, Japan

[73] Assignee: NSK Ltd., Tokyo, Japan

[21] Appl. No.: 308,445

[22] Filed: Sep. 19, 1994

[30] Foreign Application Priority Data

Sep. 21, 1993 [JP] Japan ................................. 5-256266
Mar. 14, 1994 [JP] Japan ................................. 6-068148

[51] Int. Cl.⁶ .............................................. B60R 22/415
[52] U.S. Cl. .............................................. 242/382.2
[58] Field of Search ........................... 242/382.2, 382.1,
242/382.4; 280/806, 807; 297/476, 478

[56] References Cited

U.S. PATENT DOCUMENTS

| 4,436,255 | 3/1984 | Matsui et al. | |
| 4,566,649 | 1/1986 | Petersen | 242/382.2 |
| 4,583,701 | 4/1986 | Matsui | 242/382.2 |
| 4,729,524 | 3/1988 | Befort et al. | 242/382.2 |
| 4,811,912 | 3/1989 | Takada | |
| 4,948,066 | 8/1990 | Matsumoto et al. | |
| 5,232,177 | 8/1993 | Hibata | |
| 5,257,754 | 11/1993 | Hishon | |
| 5,294,070 | 3/1994 | Sugano et al. | 242/382.2 |

FOREIGN PATENT DOCUMENTS 3-126745 12/1991 Japan .
5-72612 10/1993 Japan .

Primary Examiner—John M. Jillions
Attorney, Agent, or Firm—Sughrue, Mion, Zinn, Macpeak & Seas

[57] ABSTRACT

A seat belt retractor provides a base, a ratchet plate attached to a winding shaft for winding a webbing, a ratchet member rotatable with the winding shaft in a webbing draw-out direction for locking a rotation of the winding shaft in the webbing draw-out direction by engaging a pawl with the ratchet plate, a lock arm rotatable at a first position where the lock arm engages with the ratchet plate and a second position where the lock arm does not engage with the ratchet plate, a control plate rotated corresponding to the rotation of the winding shaft, and an operation mode switching lever having a guide pin projected at a swing end portion for rotating the lock arm to the first position and the second position, the guide pin being guided by a guide groove of the control plate, in which the guide groove includes first and second cam grooves for guiding the guide pin of the operation mode switching lever so as to rotate the lock arm to the second and first position, respectively, and a switching area provided so as to connect an end point of the first cam groove to a start point of the second cam groove, and operated to deliver the guide pin to the second cam groove for switching the lock arm from the second position to the first position.

7 Claims, 21 Drawing Sheets

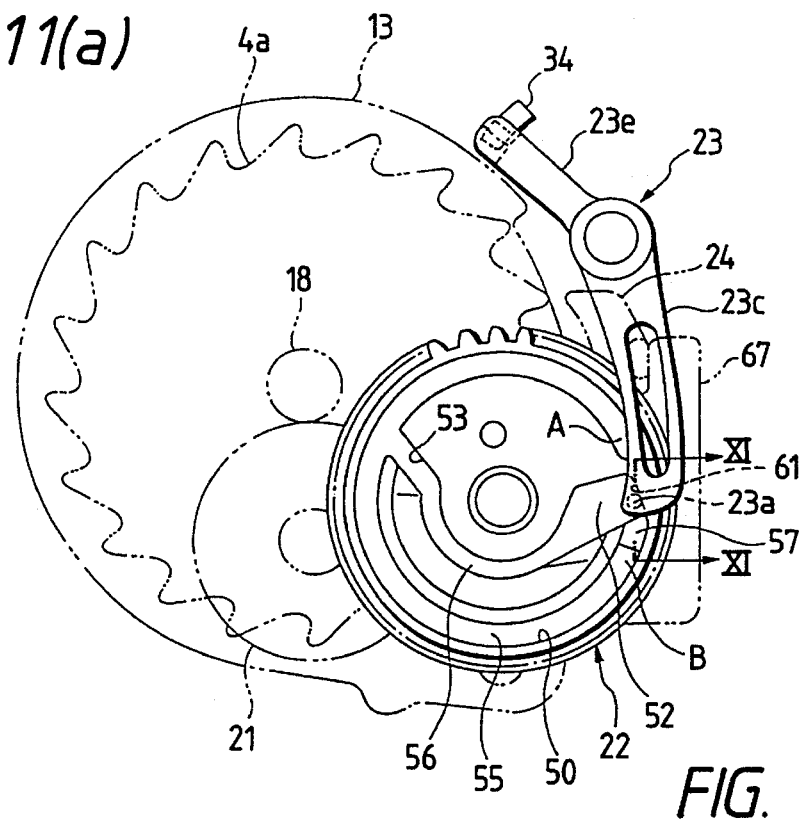
FIG. 11(a)
FIG. 11(b)
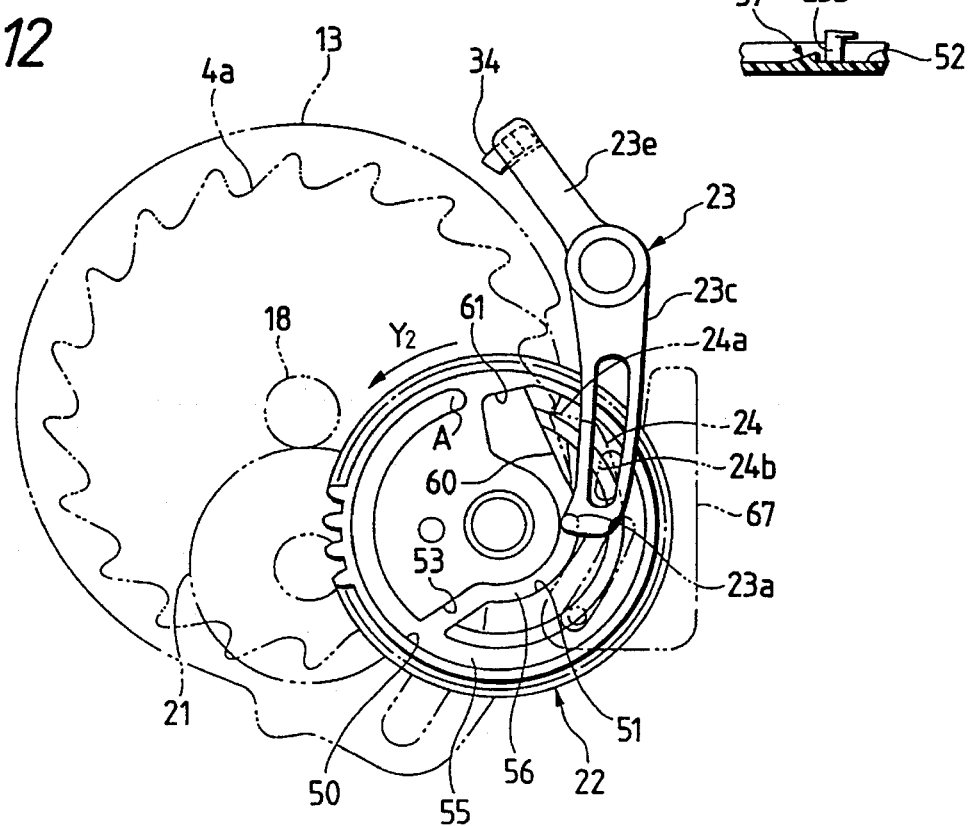
FIG. 12

RETRACTOR FOR SEAT BELT

BACKGROUND OF THE INVENTION

The present invention relates to a retractor (winding device) for a seat belt, and particularly to the improvement of a seat belt retractor having an emergency lock function and an automatic lock function.

Conventionally, a seat belt for keeping an occupant of a vehicle or the like on his or her seat safely is constituted by a webbing (or belt), a buckle, a mounting bracket and a retractor (winding device).

The retractor is a winding device for retracting a webbing automatically at the time of no use of the seat belt so as to prevent the webbing from being injured, and for changing the draw-out length of the webbing desirably at the time of use of the seat belt.

In an example of such a conventional retractor, at a normal time a webbing for restraining an occupant is allowed to be drawn out and wound desirably, so as to avoid such a problem that excessive restraining of the occupant gives an oppressive feeling to the occupant. On the other hand, an inertia detecting device responding to sudden acceleration or deceleration of the vehicle is provided to add an emergency lock function for locking a winding shaft of the webbing so that the webbing is prevented from being drawn out by use of the reaction of the inertia detecting device at the time of sudden acceleration or deceleration of the vehicle to thereby ensure the safety of the occupant. Hereinafter, the term "ELR" means an emergency locking retractor.

However, in the case of such an emergency lock function, it is impossible to prevent the webbing from being drawn out at a normal time. Accordingly, when a baggage, an auxiliary child seat (child seat), or the like, is set on a seat by use of the webbing, the webbing is gradually drawn out of the retractor by vibration or the like during the running of the vehicle, so that there is a fear that the attachment of the child seat or the like becomes loose.

Therefore, as disclosed in U.S. Pat. No. 4,811,912, Unexamined Japanese Utility Model Publication No. Hei. 3-126745, Unexamined Japanese Utility Model Publication No. Hei. 5-72612, and so on, independently of such an emergency lock function, an automatic lock function is provided for preventing a webbing from being drawn out after the setting of the webbing regardless of normal time or a case where sudden acceleration or deceleration of the vehicle occurs. Hereinafter, the term "ALR" means an automatic locking retractor. Then the automatic lock function is operated when a baggage, a child seat, or the like, is set on a seat, and the emergency lock function is operated when an occupant is restrained.

A seat belt retractor disclosed in those publications has the above-mentioned emergency lock function, and is designed so that the automatic lock function can be switched between its active state and its inactive state by proper operation of the state where the retractor winds a webbing.

A seat belt retractor disclosed in Unexamined Japanese Utility Model Publication No. Hei. 5-72612 provides a rotation lock device for engaging with a winding shaft of the retractor winding a webbing so as to lock the rotation of the winding shaft in the webbing draw-out direction; and a lock device driving mechanism for controlling the operation of the rotation lock device to form a lock state where the rotation lock device is engaged with the winding shaft to thereby prevent the winding shaft from rotating in the webbing draw-out direction, or a non-lock state where the rotation lock device is kept not so as to engage with the winding shaft so that the winding shaft is allowed to rotate in the webbing draw-out direction. The seat belt retractor further provides an operation mode switching device for setting and switching the operation mode of the lock device driving mechanism so as to be switchable between an ELR mode (emergency lock mode) where the lock device driving mechanism is operated as an emergency lock mechanism to bring the rotation lock device into the lock state in an emergency of sudden acceleration or deceleration of the vehicle or the like, and an ALR mode (automatic lock mode) where the lock device driving mechanism is operated as an automatic lock mechanism to bring the rotation lock device into the lock state whether in an emergency or not.

The operation mode switching device has an operation mode switching lever attached pivotably between an ELR mode position for setting the ELR mode and an ALR mode position for setting the ALR mode; a control plate which rotates in interlocking with the winding shaft to thereby reflect the state of the webbing wound on the winding shaft; and a guide groove provided on the control plate and guiding a guide pin provided and projecting on the operation mode switching lever, so as to control the swing of the operation mode switching lever in accordance with the state of the webbing wound on the winding shaft.

In the conventional seat belt retractor, which has such a configuration, the automatic lock function can be actuated selectively by the operation of the state of the wound webbing.

Further, in the above-mentioned Publication, the guide groove has an outer cam groove for receiving the guide pin of the operation mode switching lever, and holding the operation mode switching lever in the ELR mode position in a period from the time when the quantity of the webbing wound is the maximum to the time when a constant amount of the webbing is drawn out; a narrow groove portion (cam groove) formed to be connected to the end point of the outer cam groove, and for receiving the guide pin and holding the operation mode switching lever in the ELR mode position until the webbing is further drawn out up to the minimum winding quantity after the constant amount of the webbing is drawn out; and a wide groove portion (inner cam groove) formed so as to connect the start point of the narrow groove portion onto the way of the outer cam groove, and for receiving the guide pin returned, by the winding of the webbing, to the start point of the narrow groove portion, and holding the operation mode switching lever in the ALR mode position until the webbing is further wound up to a predetermined quantity. Further, in order to prevent the operation mode switching lever from being moved to an opposite mode position unexpectedly by the vibration of a vehicle or the like, there is provide such a technique that an urging force is given to the operation mode switching lever by a snap action spring or the like by which the urging direction is changed by use of the central, neutral position between the ELR mode position and the ALR mode position as a border.

A seat belt retractor disclosed in U.S. Pat. No. 4,811,912, Unexamined Japanese Utility Model Publication No. Hei. 3-126745 has a well-known emergency lock mechanism having a rotation lock device for engaging with a winding shaft to thereby lock the rotation of the winding shaft in the webbing draw-out direction, and an inertia detecting device for actuating the rotation lock device in an emergency of a vehicle; and an operation mode switching device for operating the inertia detecting device in accordance with the state of the wound webbing to thereby suitably move the rotation lock device to an engagement position or a disengagement position with the winding shaft. If the operation mode switching device makes the rotation lock device engage with the winding shaft, the rotation of the winding shaft in the webbing draw-out direction is locked so as to actuate an automatic lock mechanism.

Further, as an operation mode switching device used in such a seat belt retractor, for example, an operation mode switching lever (operating lever) which is movable between a position where the inertia detecting device is operated and a position where it is not operated, and a control plate (operating member) displaced relatively to the operation mode switching lever in accordance with the rotation of the winding shaft, are provided for bringing the rotation lock device to the engagement position or the disengagement position with the winding shaft. Since the operation mode switching lever is moved by the control plate, the operation mode switching lever swings between a position where the inertia detecting device is operated and a position where it is not operated, in accordance with the state in which the webbing is wound on the winding shaft. As a result, the rotation lock device is taken to the engagement position or the disengagement position.

Such an operation mode switching lever as disclosed in U.S. Pat. No. 4,811,912, Unexamined Japanese Utility Model Publication No. Hei. 3-126745 is urged to the position where the inertia detecting device is operated or the position where not operated, by an urging device (for example, a so-called snap action spring) designed to change the urging direction in the border of a neutral position by use of an over center spring, a compression spring, or the like, in accordance with necessity.

When the automatic lock mechanism is in operation, the operation mode switching lever keeps the inertia detecting device in operation by the urging force of the urging device in order to dispose the rotation lock device in the engagement position. However, if the urging device is moved beyond the neutral position by the effect of vibration, shock, or the like, which acts on the operation mode switching lever during the running of a vehicle, the urging direction of the urging device is changed over, so that the operation mode switching lever is urged in the direction in which the inertia detecting device can not be kept in operation. Then the operation mode switching lever cannot dispose the rotation lock device in the engagement position. Accordingly there is a possibility that the retractor is released from the automatic lock state.

Therefore, when a baggage, a child seat or the like is set on a seat by use of the webbing, there is a fear that the seat belt retractor is released from the automatic lock state by vibration, shock or the like during the running of a vehicle so as to return to its emergency lock state, and the webbing is therefore drawn out of the retractor gradually during the running of the vehicle to thereby loosen the attachment of the baggage, the child seat or the like.

In the case of a seat belt retractor disclosed in Unexamined Japanese Utility Model Publication No. Hei. 5-72612, in order to solve the foregoing problem, a guide groove for controlling the swing of an operation mode switching lever has a cam groove for guiding a guide pin of the operation mode switching lever. A cam surface, which is a side surface of the cam groove, contacts with the guide pin so that the operation mode switching lever is prevented from swinging to an improper mode position.

However, in the case of this seat belt retractor disclosed in Unexamined Japanese Utility Model Publication No. Hei. 5-72612, a narrow groove portion guides the guide pin until a predetermined length of the webbing is completely wound after the webbing is drawn out up to the maximum. In the position where this narrow groove portion guides the guide pin, the operation mode switching lever moves slightly toward the ALR mode position beyond the neutral position, so that the urging device changes its urging direction toward the ALR mode position. However, near the neutral position, the urging force of the urging device is so weak, and the section where the narrow groove portion guides the guide pin is comparatively so long, that the movement toward the ALR mode position is continuously prevented on the way during the guide of the narrow groove portion. Even if the guide pin reaches a wide groove portion, the operation of moving to the ALR mode position is delayed or so, so that there is a fear that the operation of the automatic lock function goes wrong.

SUMMARY OF THE INVENTION

An object of the present invention is to solve the foregoing problems in a conventional retractor.

It is another object of the present invention to provide a seat belt retractor by which the mode position of an operation mode switching lever can be switched at a stroke without stopping the switching operation on the way, and therefore by which it is possible to prevent the production of operation faults of an automatic lock function caused by the stoppage of the operation mode switching lever near a neutral position.

In order to attain the above objects, according to an aspect of the present invention, a seat belt retractor provides: a base; a ratchet plate attached to a winding shaft for winding a webbing; a ratchet member rotatable with the winding shaft in a webbing draw-out direction for locking a rotation of the winding shaft in the webbing draw-out direction by engaging a pawl with the ratchet plate; a lock arm rotatable at a first position where the lock arm engages with the ratchet plate and a second position where the lock arm does not engage with the ratchet plate; a control plate rotated corresponding to the rotation of the winding shaft; and an operation mode switching lever having a guide pin projected at a swing end portion for rotating the lock arm to the first position and the second position, the guide pin being guided by a guide groove of the control plate, and the guide groove including: a first cam groove for guiding the guide pin of the operation mode switching lever so as to rotate the lock arm to the second position; a second cam groove for guiding the guide pin of the operation mode switching lever so as to rotate the lock arm to the first position; and a switching area provided so as to connect an end point of the first cam groove to a start point of the second cam groove, and operated to deliver the guide pin to the second cam groove for switching the lock arm from the second position to the first position.

According to another aspect of the present invention, a seat belt retractor provides: a base; a ratchet plate attached to a winding shaft for winding a webbing; a ratchet member rotatable with the winding shaft in a webbing draw-out direction for locking a rotation of the winding shaft in the webbing draw-out direction by engaging a pawl with the ratchet plate; a lock arm rotatable at a first position where the lock arm engages with the ratchet plate and a second position where the lock arm does not engage with the ratchet plate; a control plate rotated corresponding to the rotation of the winding shaft; an operation mode switching lever having a guide pin projected at a swing end portion for rotating the lock arm to the first position and the second position, the guide pin being guided by a guide groove of the control plate; an emergency lock mechanism for preventing the webbing from being drawn out in an emergency; and an automatic lock mechanism for preventing the webbing from being drawn out in accordance with a winding state of the webbing wound on the winding shaft regardless of whether it is in the emergency or not, in which the guide groove includes: a first cam groove for guiding the guide pin of the operation mode switching lever so as to rotate the lock arm to the second position; a second cam groove for guiding the guide pin of the operation mode switching lever so as to rotate the lock arm to the first position; and a switching area provided so as to connect an end point of the first cam groove to a start point of the second cam groove, and operated to deliver the guide pin to the second cam groove for switching the lock arm from the second position to the first position.

According to a still further aspect of the present invention, the seat belt retractor provides: a base; a rotation lock device for locking in a webbing draw-out direction a rotation of a winding shaft for winding a webbing; a lock device driving mechanism for controlling the rotation lock device so as to form a lock state where the rotation in the webbing draw-out direction is prevented and an anti-lock state where the rotation in the webbing draw-out direction is allowed, selectively; and an operation mode switching device for switching an operation mode of the lock device driving mechanism between an emergency lock mode where the rotation lock device is set to the lock state in an emergency of a vehicle and an automatic lock mode where the rotation lock device is set to the lock state regardless of whether it is in the emergency or not; in which the operation mode switching device includes: an operation mode switching lever attached pivotably between an emergency lock mode position for setting the emergency lock mode and an automatic lock mode position for setting the automatic lock mode; a control plate rotated in interlocking with the winding shaft for controlling the swing of the operation mode switching lever, the control plate including a guide groove for receiving a guide pin projected on the operation mode switching lever; and a lock arm for bringing the operation mode of the lock device driving mechanism into the automatic lock mode, and in which the guide groove includes: a first cam groove for guiding the guide pin so as to maintain the operation mode switching lever in the emergency lock mode position; a second cam groove for guiding the guide pin so as to maintain the operation mode switching lever in the automatic lock mode position; and a switching area provided so as to connect an end point of the first cam groove to a start point of the second cam groove, and operated to deliver the guide pin to the second cam groove for switching the mode position of the operation mode switching lever from the emergency lock mode position to the automatic lock mode position.

According to the above-mentioned structure of the present invention, the mode position of the operation mode switching lever is switched from the ELR position to the ALR mode position by the switching area following the end point of the first cam groove of the guide groove of the control plate, so that the guide pin of the operation mode switching lever cannot return to the first cam groove on the ELR mode side by the function of the step portion at the beginning of winding or immediately after winding after the webbing is drawn out up to the maximum. As a result, the switching from the ELR mode to the ALR mode becomes sure. After switching to the ALR mode position completely, the ALR mode position is maintained by the second cam groove.

The mode position of the operation mode switching lever is switched from the ALR mode position to the ELR mode position by the cam surface provided at the end point of the second cam groove when the quantity of the wound webbing reaches to a predetermined value after the whole amount of the webbing is drawn out. Therefore, it is possible to avoid the operation faults of the automatic lock function caused by the operation mode switching lever stopping near the neutral position.

In addition, according to the above-mentioned structure, when the swinging end portion of the operation mode switching lever engages with the first cam groove of the control plate, the operation mode switching lever is urged to a position where the operation mode switching lever does not actuate the inertia detecting device to operate by the urging device. On the other hand, when the swinging end portion of the operation mode switching lever is moved to a side of the second cam groove of the control plate, the operation mode switching lever is urged to a position where the operation mode switching lever actuates the inertia detecting device to operate by the urging device.

That is, the operation mode switching lever is urged by the urging device to the position where it actuates the inertia device to operate or to the position where it does not actuate the inertia device to operate. At the same time, the swinging end portion of the operation mode switching lever engages with the first or second cam groove of the control plate so that the operation mode switching lever is prevented from swinging unexpectedly. Accordingly, there is no fear that the urging direction of the urging device for urging the operation mode switching lever is changed unexpectedly by vibration, shock or the like.

BRIEF DESCRIPTION OF THE DRAWINGS

In the accompanying drawings:

FIG. 11(a) is a diagram for explaining the operation mode of the inertia detecting device in accordance with a change of the state of the wound webbing according to the first embodiment of the present invention;

FIG. 11(b) is a sectional view of a portion taken on XI—XI line in FIG. 11(a);

FIG. 12 is a diagram for explaining the operation mode of the inertia detecting device in accordance with a change of the state of the wound webbing according to the first embodiment of the present invention;

DETAILED DESCRIPTION OF THE PREFERRED EMBODIMENTS

Embodiments of the present invention will be described below with reference to the accompanying drawings.

First, a schematic structure of a seat belt retractor according to a first embodiment of the present invention will be described with reference to FIGS. 6 to 8.

Figure 6:
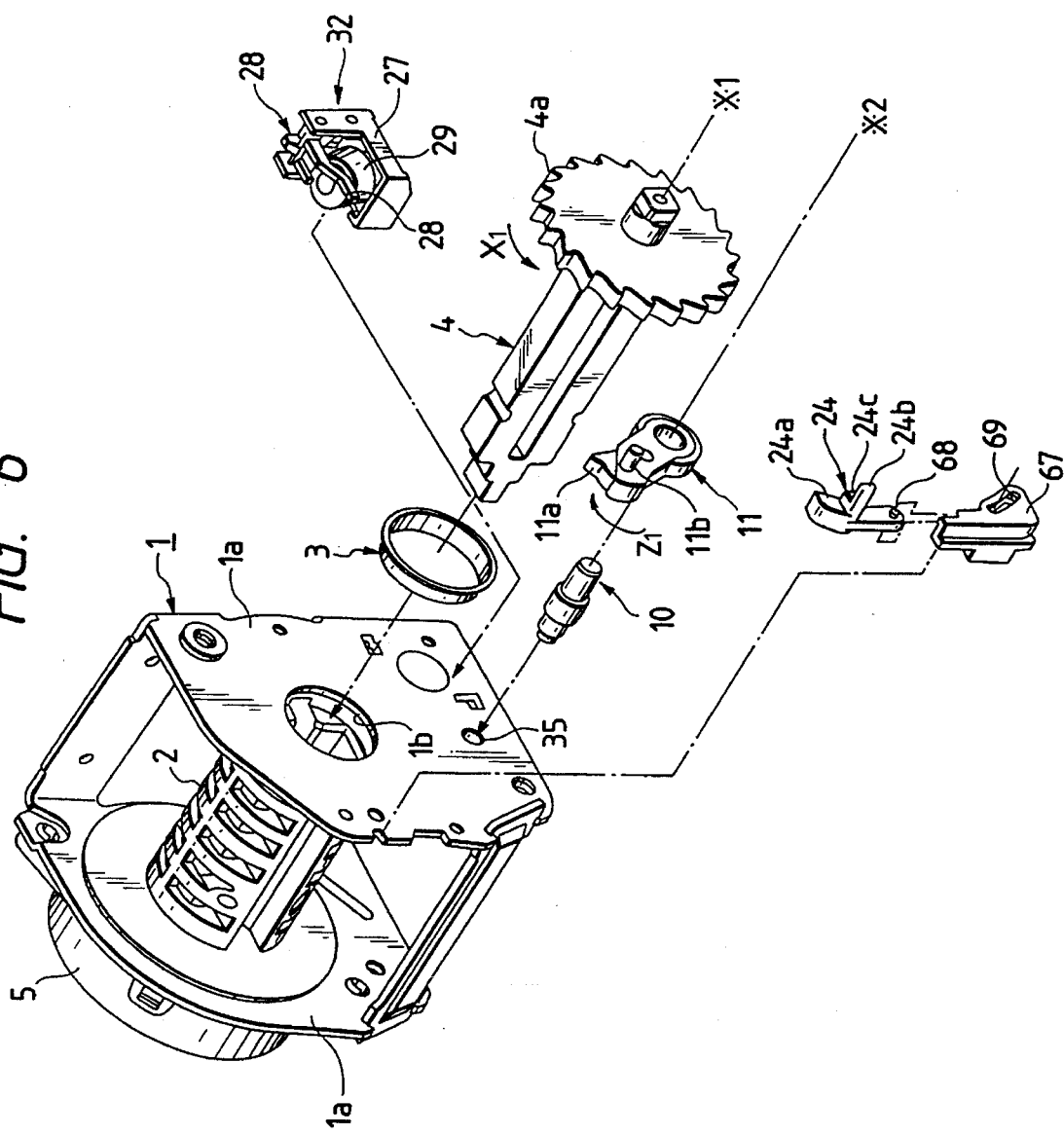
FIG. 6 is a part of an exploded perspective view illustrating the seat belt retractor according to the first embodiment of the present invention.
Figure 7:
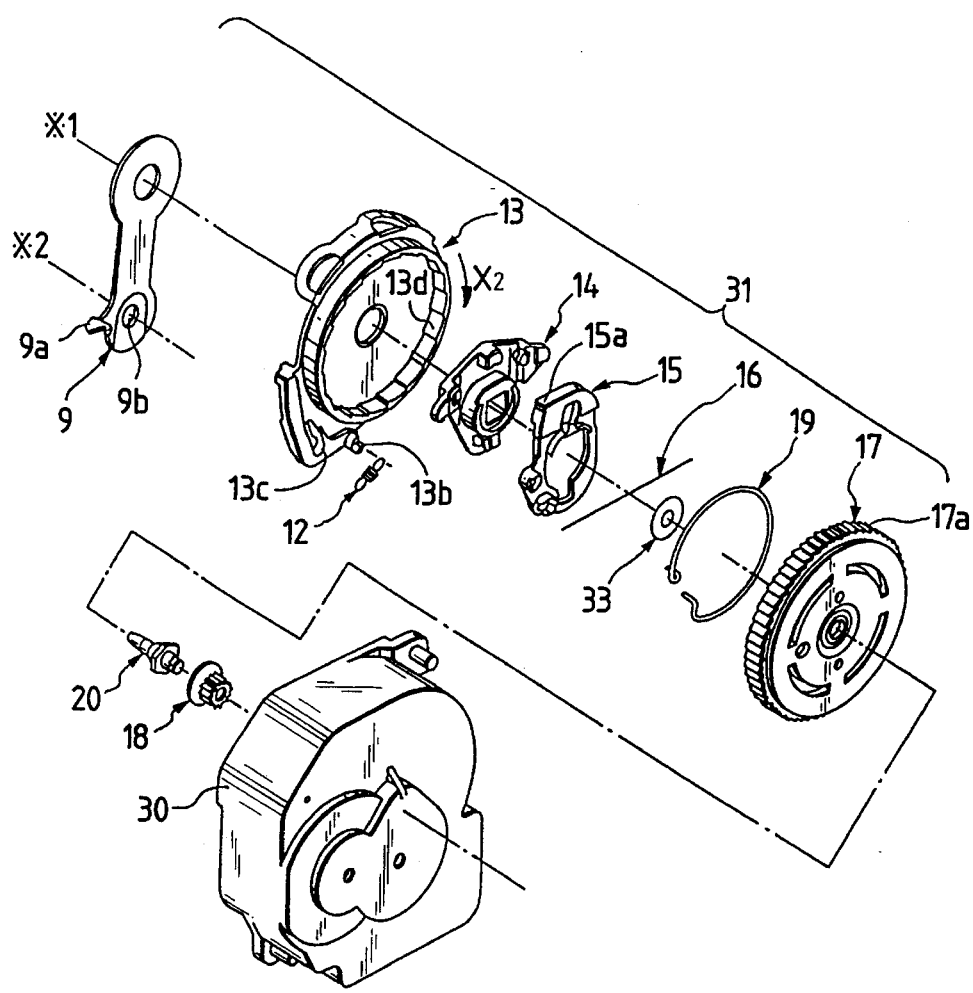
FIG. 7 is a part of the exploded perspective view illustrating the seat belt retractor according to the first embodiment of the present invention.

In the exploded perspective view of the seat belt retractor of this embodiment shown in FIGS. 6 and 7, a base 1 has an substantially U-shaped section in most of its portions. Through holes 1b are provided in opposition to each other in opposite side plates 1a, respectively. A winding shaft 4 on which a bobbin 2 for winding a webbing thereon is fixed is laid rotatably through right and left plastic bushes 3 so as to bridge the through holes 1b. A well-known winding spring device 5 is disposed at one end of the winding shaft 4 so as to always urge the winding shaft 4 in the direction to wind the webbing.

On the other hand, at the other end of the winding shaft 4, there is provided a lock mechanism having a function, as an emergency lock mechanism, for preventing the webbing from being drawn out in case of emergency, and a function, as an automatic lock mechanism, for preventing the webbing from being drawn out in accordance with the webbing winding state on the winding shaft 4 regardless of the fact it is in case of emergency or not. This lock mechanism has a rotation lock device constituted by a ratchet plate 4a which is a ratchet wheel fixed to the other end portion of the winding shaft 4, and a pawl 11 which is a ratchet member for engaging with the teeth of the ratchet plate 4a and thereby restricting the rotation of the ratchet plate 4a in the webbing draw-out direction (in the direction of the arrow $X_1$). The lock mechanism also has an inertia detecting device 31 having a function as a lock device driving mechanism for controlling the operation of the rotation lock device so as to form a lock state where the rotation lock device engages with the winding shaft 4 to prevent the winding shaft 4 from rotating in the webbing draw-out direction or a non-lock state where the rotation lock device is kept not to engage with the winding shaft 4 to allow the winding shaft 4 to rotate in the webbing draw-out direction.

An end portion of the winding shaft 4 projects outside the ratchet plate 4a. A tension plate 9 and a ratchet cup 13 which is a ratchet member are loose fitted to the projecting end portion of the winding shaft 4 in order to constitute the inertia detecting device 31. A return spring 12 is attached to spring hangers 13b and 9a formed in the ratchet cup 13 and the tension plate 9 respectively so that an urging force is given to the ratchet cup 13 to rotate the ratchet cup 13 in the direction of the arrow $X_2$ in FIG. 7. A flange 14 constituting the lock device together with a lock member 15 having a lock portion 15a for engaging with inner teeth 13d of the ratchet cup 13, and a sensor spring 16 are fixed to the end portion of the winding shaft 4 projecting outside the ratchet cup 13. Further, a ratchet wheel 17 which is an inertia member loosely fitted to a tapping screw 20 screwed down to the end portion of the winding shaft 4 through a plane washer 33 is provided outside the lock member 15. On the outer circumference of the ratchet wheel 17, a plurality of teeth 17a looking toward the belt draw-out direction are provided for engaging with a sensor arm 28 of a vehicle acceleration detecting device 32 which will be described later. In a mounting portion provided inside the ratchet wheel 17, a friction spring 19 is mounted slidably. Since the friction spring 19 is engaged with the lock member 15, the ratchet wheel 17 can rotate together with the winding shaft 4 and be displaced relatively to the winding shaft 4.

On the other hand, the pawl 11 for restricting the rotation of the ratchet plate 4a in the webbing draw-out direction (in the direction of the arrow $X_1$ in FIG. 6) by engaging an engagement portion 11a with the ratchet plate 4a is pivoted through a pawl pin 10 outside the side plate 1a so as to be engagable with and detachable from the ratchet plate 4a. One end portion of this pawl pin 10 is inserted to a through hole 35 formed in the side plate 1a while the other end portion is inserted to a through hole 9b of the tension plate 9, so as to prevent the pawl pin 10 from falling down by the load of the engagement between the pawl 11 and the ratchet plate 4a. Therefore, the pawl 11 can swing about the pawl pin 10. A pawl guide projection 11b projects over the pawl 11, and the pawl guide projection 11b is inserted to a pawl guide hole 13c formed to project over the outer circumferential portion of the ratchet cup 13.

Further, a sensor case 27 constituting the vehicle acceleration detecting device 32 is fixed to the lower portion of the side plate 1a. A ball weight 29 which is a sensor is mounted inside a hollow portion of the sensor case 27, and the sensor arm 28 having a projection 28a is pivotably attached into the hollow portion. A sensor cover 30 covering the lock mechanism constituted by those parts is disposed outside the side plate 1a.

Figure 8:
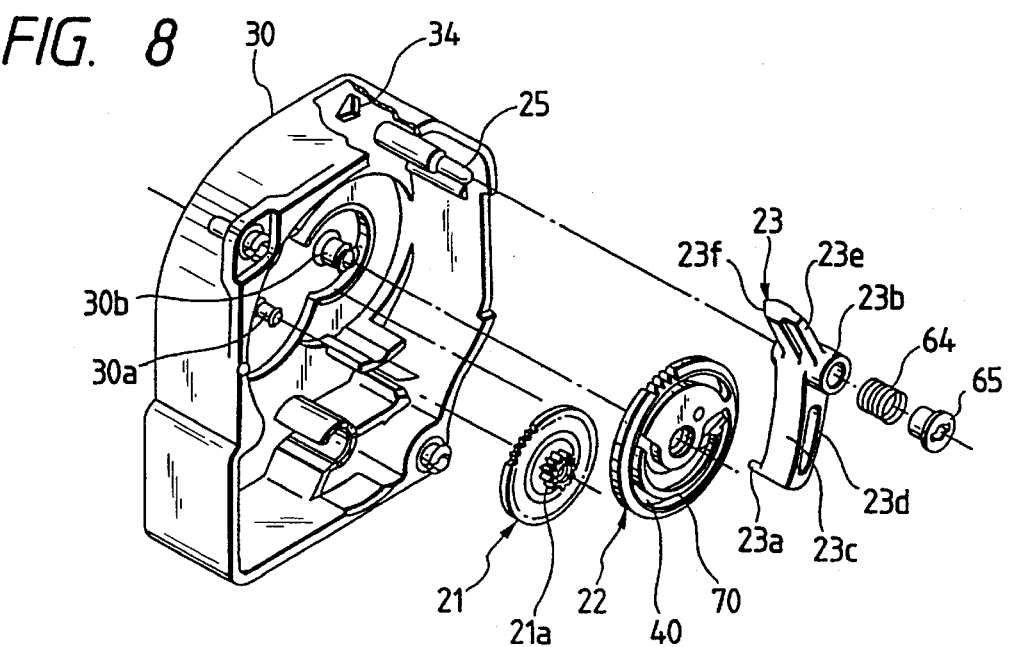
FIG. 8 is a part of the exploded perspective view illustrating the seat belt retractor according to the first embodiment of the present invention.

As shown in FIG. 8, an idle gear 21 gearing with a main gear 18 fixed to the tapping screw 20 (refer to FIG. 7), and a control plate 22 as a control disk for gearing with a pinion 21a of the idle gear 21 to rotate in a reduced rate are rotatably supported on sub-shafts 30a and 30b provided and projecting on the inner wall of the sensor cover 30 respectively. The control plate 22 is formed of synthetic resin. In the inner surface of the control plate 22, there is formed a guide groove 40 (which device the whole guide groove) which is a guide portion constituting an operation mode switching device together with an operation mode switching lever 23 and a lock arm 24, which will be described later.

Here, the operation mode switching device is defined to be a mechanism for setting and switching the operation mode of the inertia detecting device 31 having a function as a lock device driving mechanism, so as to bring the inertia detecting device 31 into an ELR mode where the inertia detecting device 31 is operated as an emergency lock mechanism for bringing the rotation lock device into a lock state in an emergency such as at the time of sudden deceleration of a vehicle, and an ALR mode where the inertia detecting device 31 is operated as an automatic lock mechanism for bringing the rotation lock device into a lock state regardless of the fact as to whether system is in case of emergency or not.

Further, the operation mode switching lever 23, which is a lever member made of synthetic resin, is pivotably supported on a pivot 25 projectingly provided on the inner wall of the sensor cover 30. The operation mode switching lever 23 is constituted by a cylindrical portion 23b loose fitted to the pivot 25, a cam arm 23c extended from the cylindrical portion 23b toward the outside in the radial direction, and a flexible arm portion 23e extended toward the outside in the radial direction oppositely to the cam arm portion 23c. A guide pin 23a, which is an engagement portion provided so as to project on a swinging end portion of the cam arm portion 23c, engages with the guide groove 40 of the control plate 22 so that the operation mode switching lever 23 can swing along the guide groove 40 between an ELR mode position for setting the ELR mode and an ALR mode position for setting the ALR mode.

In this embodiment, an operation mode switching device is constituted by the idle gear 21, the control plate 22, the operation mode switching lever 23, the sensor cover 30 and so on, and each structure of these parts will be described in detail with reference to FIGS. 1 to 5.

The control plate 22 rotates together with the winding shaft 4 through the main gear 18, the idle gear 21 and so on, so as to reflect the state where the webbing is wound on the winding shaft 4. On this control plate 22, formed is the guide groove 40 for guiding the guide pin 23a projecting over the operation mode switching lever 23 to thereby control the swing of the operation mode switching lever 23 in accordance with the state where the webbing is wound on the winding shaft 4.

Figure 4:
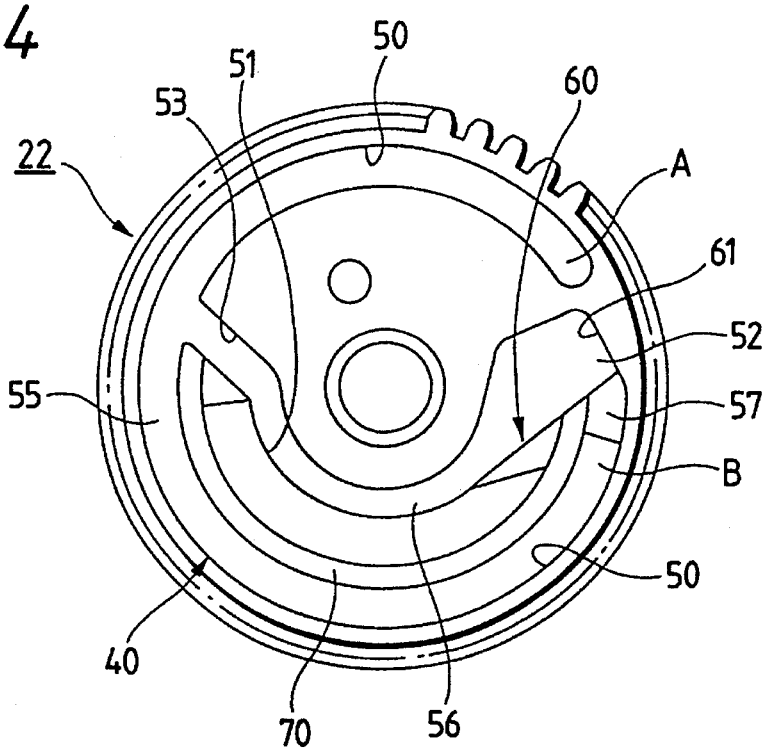
FIG. 4 is a diagram for explaining the structure of the guide groove of the control plate according to the first embodiment of the present invention.

As shown in FIG. 4, in the control plate 22, the guide groove 40 is constituted by an outer cam groove 55 which is a first cam groove formed in an outer-sided position close to a gear portion of the outer periphery of the control plate 22, an inner cam groove 56 which is a second cam groove formed on the inner side of the outer cam groove 55 so as to be half as long as the cam groove 55, and a switching area 52 formed so as to connect the cam grooves 55 and 56 to each other.

A side wall 50 (a side wall which is outer-sided in the radial direction of the control plate 22) of the outer cam groove 55 has a function to guide the guide pin 23a slidably, and becomes a guide surface for guiding the guide pin 23a so that the operation mode switching lever 23 is kept in the ELR mode position in a period from the time when the quantity of the wound webbing becomes the maximum to the time a little before the quantity of the wound webbing becomes the minimum. The position A shown in the outer cam groove 55 designates the place where the guide pin 23a is located when the quantity of the wound webbing becomes the maximum (that is, the place on the start point side of the guide groove in the ELR mode), and on the other hand, the position B designates the place where the guide pin 23a is located a little before the quantity of the wound webbing becomes the minimum (that is, the place on the end point side of the guide groove in the ELR mode). The length (circumferential length) of the outer cam groove 55 depends on the maximum drawn-out length of the webbing and the reduction ratio of the idle gear 21, and is designed to have a length substantially as long as one round of the outer circumferential portion of the disc-like control plate 22.

The inner cam groove 56 is a groove for guiding the guide pin 23a so that the operation mode switching lever 23 is kept in the ALR mode position in a period from the time when the quantity of the wound webbing becomes the minimum to the time when the webbing is wound completely. The inner cam groove 56 is disposed on the inner side of the outer cam groove 55, and separated therefrom with a constant distance by a partition 70.

The partition 70 prevents such a trouble that the guide pin 23a jumps to the outer cam groove 55 due to the swing of the operation mode switching lever 23 or the like caused by the vibration of a vehicle or the like. The side wall of the inner cam groove 56 on the outer cam groove 55 side is made to be an inclined surface 51. In the inner cam groove 56 on its end point side and on a side wall opposite to the inclined surface 51, there is provided a cam surface 53 which is bent so as to urge the guide pin 23a in the radial and outward direction of the control plate 22 when the guide pin 23a moves to the outer cam groove 55.

This cam surface 53 is a guide surface by which the guide pin 23a reaching the end point of the inner cam groove 56 is guided (returned) onto the way of the outer cam groove 55, so that the mode position of the operation mode switching lever 23 is switched from the ALR mode position to the ELR mode position at a stroke.

The switching area 52 is a guide area which is provided to connect the end point of the outer cam groove 55 and the start point of the inner cam groove 56, and by which the mode position of the operation mode switching lever 23 is switched from the ELR mode position to the ALR mode position so as to deliver the guide pin 23a to the inner guide groove 56 at the beginning of winding after the quantity of the wound webbing becomes the minimum.

Figure 5:
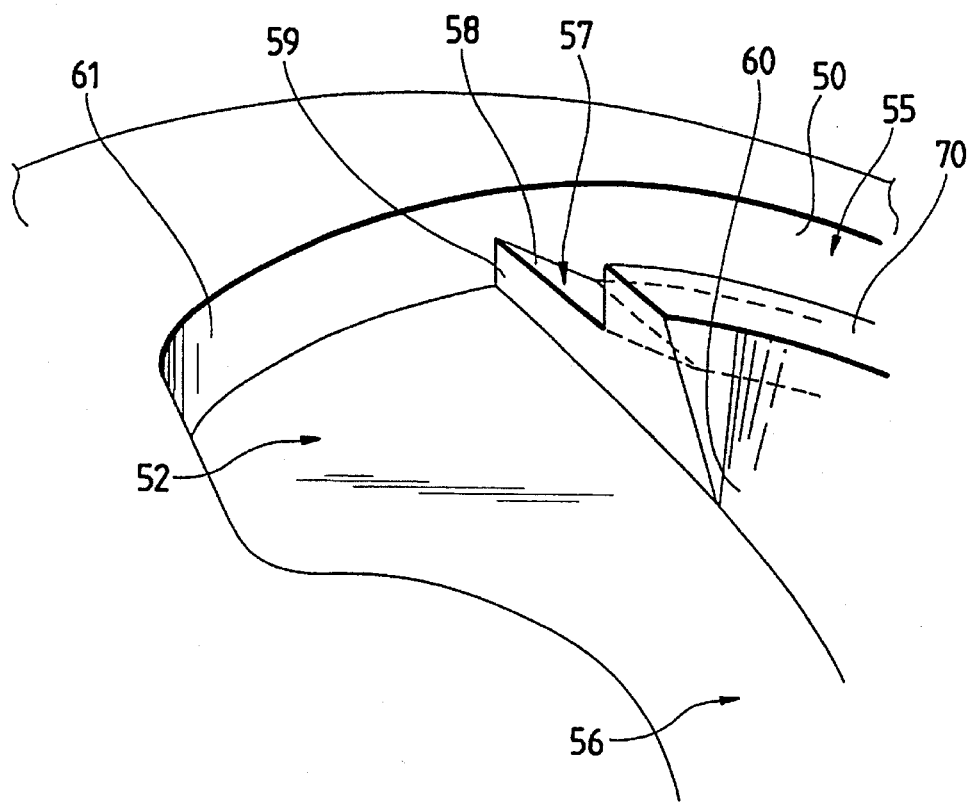
FIG. 5 is a perspective view illustrating the structure of a main portion of the guide groove according to the first embodiment of the present invention.

As shown in FIG. 5, on the border between the switching area 52 and the outer cam groove 55, there is provided a step portion 57 constituted by an inclined surface 58 for allowing the guide pin 23a to move from the outer cam groove 55 to the switching area 52, and a step surface 59 for preventing the guide pin 23a from returning from the switching area 52 to the outer cam groove 55. That is, by this step portion 57, the guide pin 23a can climb over the inclined surface 58 easily in the case of the movement from the outer cam groove 55 to the switching area 52 while the guide pin 23a is prevented from moving by the step surface 59 standing substantially upright in the case of the relative movement from the switching area 52 side to the outer cam groove 55 side. The step surface 59 is connected with the inclined surface 51 of the inner cam groove 56 through a cam surface 60, so as to be operated as a guide surface for taking the guide pin 23a to the inner cam groove 56 at the beginning of winding the webbing.

In the innermost portion of the switching area 52, there is provided a cam surface 61 by which the guide pin 23a can be guided to the inside of the control plate 22 when the guide pin 23a is drawn in largely.

Figure 1:
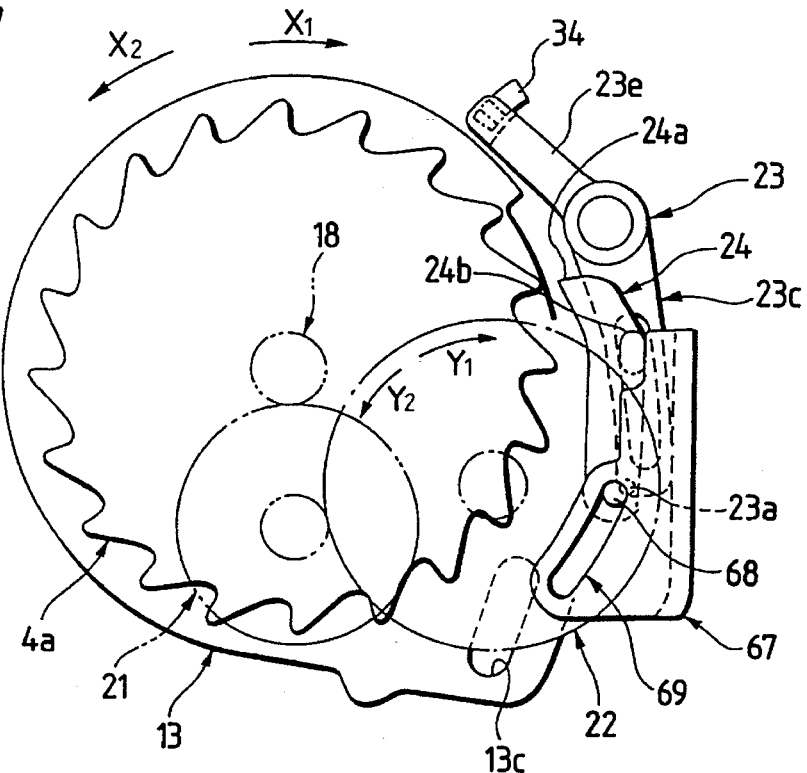
FIG. 1 is a front view illustrating a main portion of the seat belt retractor according to a first embodiment of the present invention.
Figure 2:
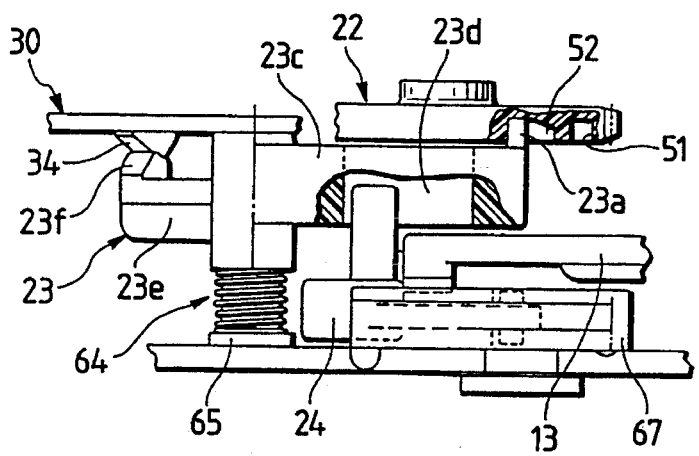
FIG. 2 is a side view illustrating the main portion of the seat belt retractor according to the first embodiment of the present invention.

As shown in FIGS. 2 and 8, the cylindrical portion 23b is loosely fitted onto the pivot 25 of the sensor cover 30, and a coil spring 64 and a detachment prevention clip 65 are attached to the top end of the pivot 25 inserted into the cylindrical portion 23b, so that the operation mode switching lever 23 is urged to the sensor cover 30 by a predetermined elastic force, and at the same time is made rotatable about the pivot 25.

Figure 3:
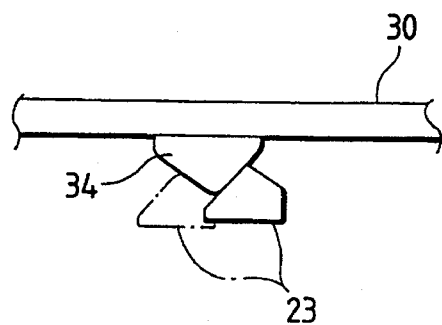
FIG. 3 is a diagram for explaining the structure of engagement between the operation mode switching lever and the sensor cover for giving a predetermined urging force to the operation mode switching lever according to the first embodiment of the present invention.

As shown in FIGS. 2 and 3, a first lock convex portion 34 having a triangular section is projected on the inner wall of the sensor cover 30 by the urging force of the coil spring 64. A second lock convex portion 23f having a triangular section is formed at the swinging end portion of the flexible arm portion 23e. The second lock convex portion 23f is engaged with the first lock convex portion 34. The first and second lock convex portions 34 and 23f constitute an urging device which can urge the operation mode switching lever 23 so that the direction of the urging force is changed between the ELR mode position side and the ALR mode position side with the neutral position (position of the apex of the triangle) as a border, by the effect of the elastic force of the flexible arm portion 23e in the direction of a rotating axis, and the drag of the inclined surfaces opposingly pressed to each other. Accordingly, the operation mode switching lever 23 is swingable about the pivot 25 and is urged to each of the swinging ends.

Further, an engagement projection 24b of the lock arm 24 swingably pivoted on the side plate 1a of the base 1 through a guide member 67 (refer to FIGS. 2 and 6) attached to the side plate 1a of the base 1 can be made to engage, through the outer circumferential neighborhood of the ratchet cup 13, with a cam groove 23d formed into a long hole through the cam arm portion 23c.

This lock arm 24 is fitted at its lower end engagement pin 68 into a long hole 69 of the guide member 67 so as to be rotatable with the engagement pin 68 as a center of rotation. A swinging end of the lock arm 24 is urged in a direction separating from a rotational center of the winding shaft 4.

As the operation mode switching lever 23 swings, an engagement portion (latch) 24a of the lock arm 24 is engaged with the teeth of the ratchet plate 4a, so that the lock arm 24 constituting the above-mentioned operation mode switching device together with the operation mode switching lever 23 can bring the operation mode of the inertia detecting device 31, which is a lock device driving mechanism, into the ALR mode. When the engagement portion 24a is not engaged with the teeth of the ratchet plate 4a, the lock arm 24 can bring the operation mode of the inertia detecting device 31 into the ELR mode. Thus the lock arm 24 can take two first and second positions, for engaging and not-engaging with the ratchet plate 4a, respectively.

Next, the operation of the above-mentioned seat belt retractor will be described.

Figure 9:
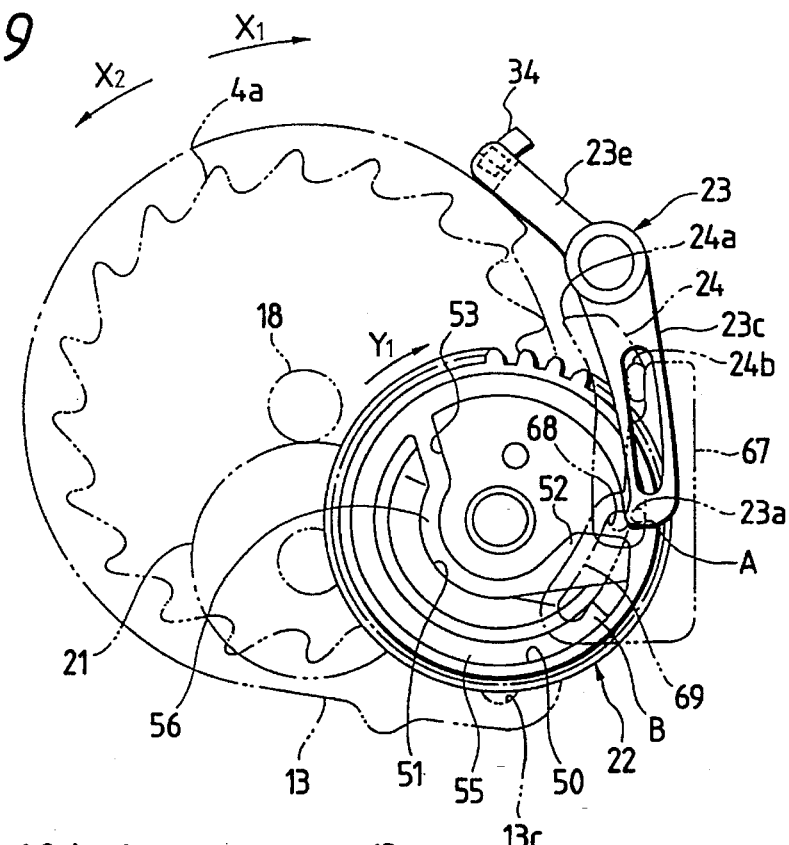
FIG. 9 is a diagram for explaining the operation mode of the inertia detecting device in accordance with a change of the state of the wound webbing according to the first embodiment of the present invention.
Figure 15:
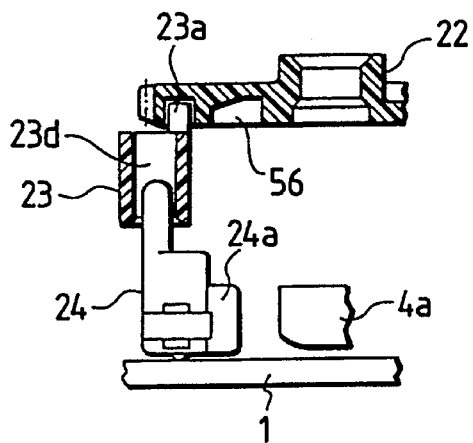
FIG. 15 is a sectional view illustrating the ELR mode state according to the first embodiment of the present invention.
Figure 16:
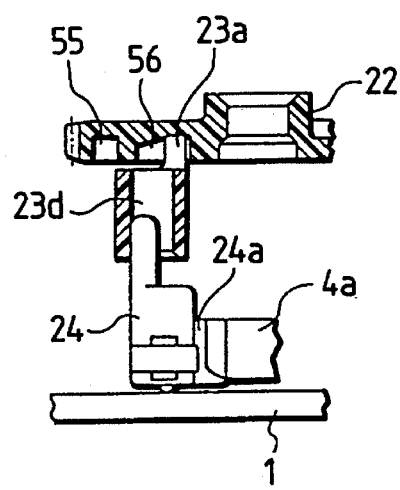
FIG. 16 is a sectional view illustrating the ALR mode state according to the first embodiment of the present invention.

First, in the state where the whole amount of the webbing is wound up, as shown in FIG. 9, the guide pin 23a of the operation mode switching lever 23 is disposed in the position A on the start point of the outer cam groove 55 of the control plate 22, and at the same time, the guide pin 23a is pressed onto the side wall 50 of the outer cam groove 55 by the repulsion between the first lock convex portion 34 and the second lock convex portion 23f. As shown in FIGS. 2 and 15, the lock arm 24 is held between the operation mode switching lever 23 and the guide member 67, and kept away from the ratchet plate 4a, so that the ratchet cup 13 can rotate relatively to the winding shaft 4. In this case, the inertia detecting device 31 is in the ELR operation mode.

Next, if the webbing begins to be drawn out of the retractor, the winding shaft 4 begins to rotate in the direction of the arrow $X_1$ in FIGS. 6 and 9, and the main gear 18 fixed to the tapping screw 20 rotated by the rotation of the winding shaft 4 also begins to rotate in the same direction. Therefore, the control plate 22 is decelerated by the idle gear 21, and begins to rotate in the direction of the arrow Y1 as shown in FIG. 9, and the guide pin 23a of the operation mode switching lever 23 runs along the side wall 50 of the outer cam groove 55.

Even if the webbing is further still drawn out so that the guide pin 23a closes to the outlet portion of the inner cam groove 56 on the way of the outer cam groove 55, then the guide pin 23a is urged to contact with the side wall 50, so that there is no fear that the guide pin 23a enters the inner cam groove 56.

Thus, while the guide pin 23a is being guided by the outer cam groove 55 of the control plate 22, there is no case that the engagement portion 24a of the lock arm 24 engages with the teeth of the ratchet plate 4a to thereby switch the operation mode of the inertia detecting device 31 to the ALR mode. Accordingly, the ELR mode is kept so that the inertia detecting device 31 is operated as a normal emergency lock mechanism (that is, the automatic lock function is kept inactive).

Figure 18:
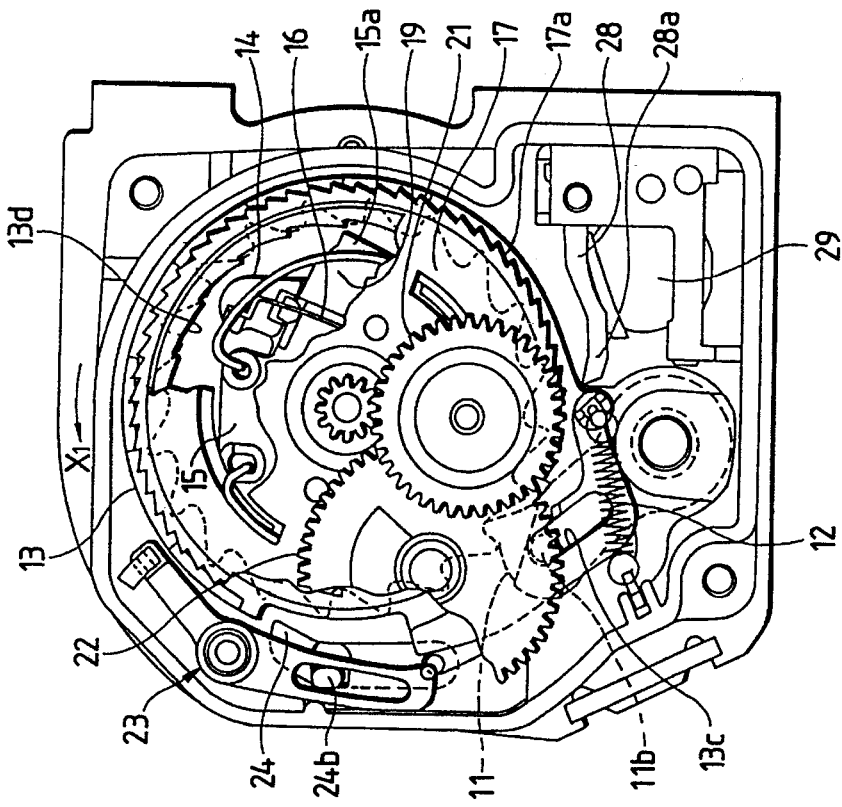
FIG. 18 is a diagram for explaining a non-lock state in the ELR mode according to the first embodiment of the present invention.

That is, in a normal use, as shown in FIG. 18, the ratchet cup 13 is urged in the webbing winding direction (the direction of the arrow $X_2$) by the urging force of the return spring 12 attached to the spring hanger 13b and the spring hanger 9a of the tension plate 9, and the pawl 11 having the pawl guide projection 11b engaging with the pawl guide hole 13c is urged in the direction where the pawl 11 does not engage with the ratchet plate 4a. In addition, the lock portion 15a of the lock member 15 is urged to the position not to engage with the inner teeth 13d of the ratchet cup 13 by the urging force of the sensor spring 16. Consequently, the webbing can be drawn out freely.

Figure 19:
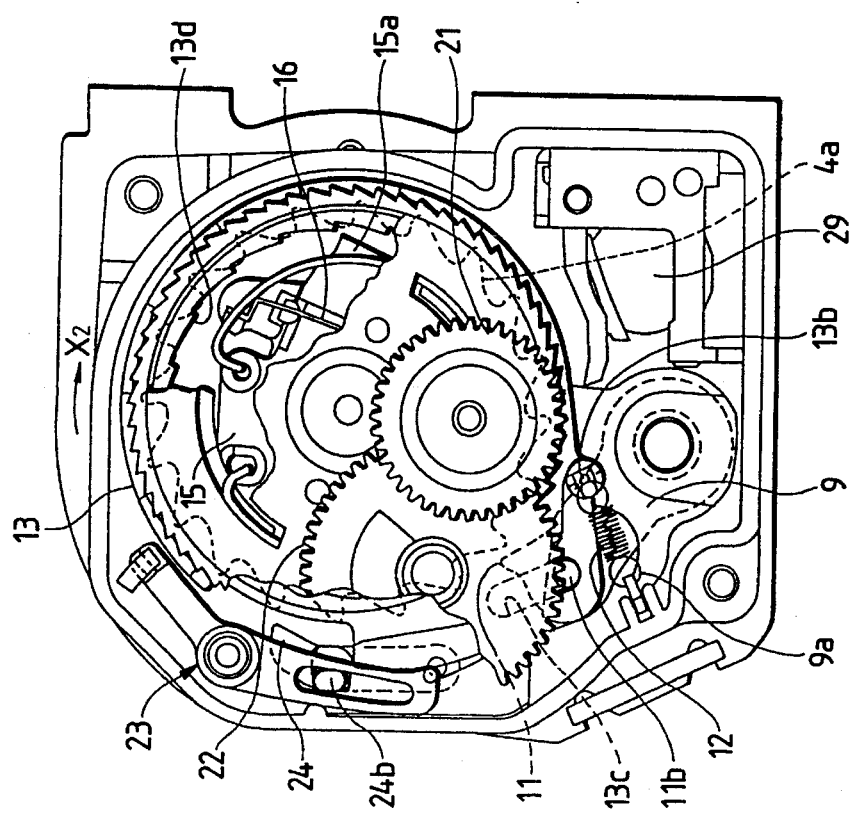
FIG. 19 is a diagram for explaining a lock state in the ELR mode according to the first embodiment of the present invention.

If tension is given to the webbing (not shown) in case of emergency such as a collision or the like so that an impacting rotating force exceeding a predetermined value in the webbing draw-out direction (in the direction of the arrow $X_1$) is exerted on the winding shaft 4 as shown in FIG. 19, then the ratchet wheel 17 receives an inertia force so as to produce delay in rotation of the winding shaft 4 in the webbing drawout direction (the direction of the arrow $X_1$). Then, if the force with which the engagement portion of the friction spring 19 mounted on the mounting portion of the ratchet wheel 17 pushes the lock member 15 in the direction of the engagement of the lock portion 15a with the inner teeth 13d is stronger than the urging force of the sensor spring 16, then the lock member 15 is moved in the direction of the engagement of the lock portion 15a with the inner teeth 13d. Then, the lock portion 15a of the lock member 15 engages with the inner teeth 13d of the ratchet cup 13, so that the rotation force of the flange 14 is transmitted to the ratchet cup 13 and the inertia detecting device 31 is actuated to rotate the ratchet cup 13 in the direction of the arrow $X_1$ against the urging force of the return spring 12.

At this time, the pawl guide hole 13c engaging with the pawl guide projection 11b rotates the pawl 11 in the direction of the arrow $Z_1$ (refer to FIG. 6) through the pawl guide projection 11b so as to engage the pawl 11 with the ratchet plate 4a. As a result, the lock state is produced so as to prevent the rotation of the winding shaft 4 in the direction of the arrow $X_1$, that is, to prevent the draw-out of the webbing. When the ratchet cup 13 is rotated in the direction of the arrow $X_1$, the lock arm 24 remains being held between the inner cam groove 23d of the operation mode switching lever 23 and the guide member 67, so that the lock arm 24 is left not engaging with the ratchet plate 4a.

If a vehicle receives a change of speed more than a predetermined value in an emergency, the ball weight 29 rolls to swing the sensor arm 28, so as to engage the top end 28a thereof with the teeth 17a of the ratchet wheel 17. Accordingly, the ratchet wheel 17 is prevented from rotating in the belt draw-out direction. If the webbing is further drawn out in the state where the ratchet wheel 17 is prevented from rotating, the ratchet wheel 17 has rotation delay relative to the rotation of the winding shaft 4 in the webbing draw-out direction, so that the rotation lock device is operated to lock the draw-out of the webbing as mentioned above.

When the tension acting on the webbing is released, the ratchet cup 13 is rotated in the direction of the arrow $X_2$ through the urging force of the return spring 12 so as to make the pawl 11 swing in the direction opposite to the direction of the arrow $Z_1$ in FIG. 6. Accordingly, the ratchet plate 4a is released from being locked, so as to allow the webbing to be drawn out desirably.

Figure 10A:
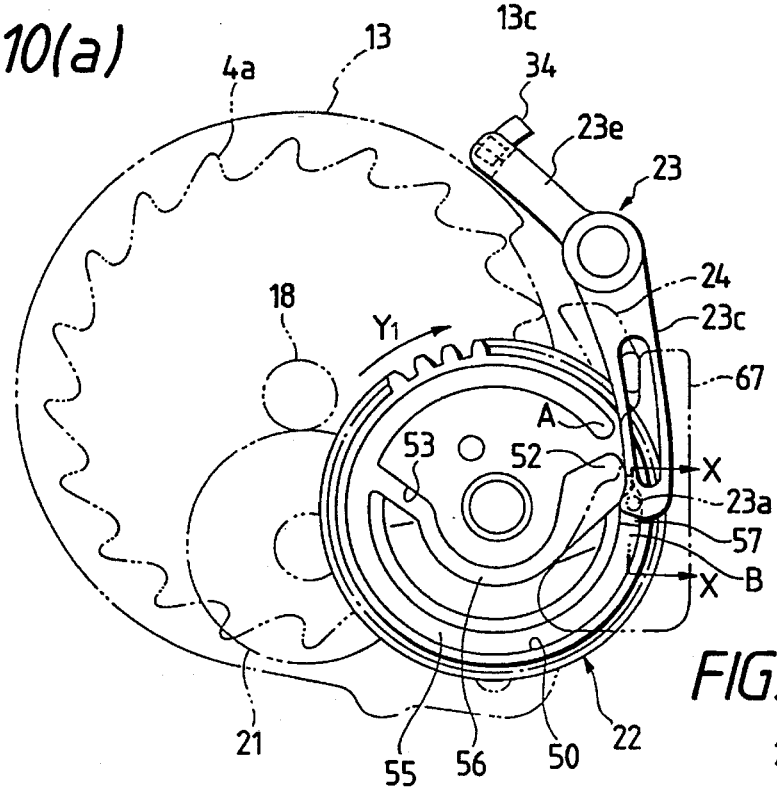
FIG. 10(a) is a diagram for explaining the operation mode of the inertia detecting device in accordance with a change of the state of the wound webbing according to the first embodiment of the present invention.
Figure 10B:
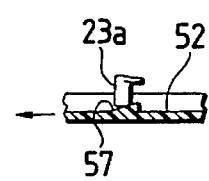
FIG. 10(b) is a sectional view of a portion taken on X—X line in FIG. 10(a)

Such an ELR mode state continues until the webbing is further drawn out so that the guide pin 23a of the operation mode switching lever 23 enters the switching area 52 of the guide groove 40 to thereby switch the operation mode. FIGS. 10 and 11 respectively show the state where the quantity of the drawn-out webbing closes near almost the whole amount thereof so that the guide pin 23a is beyond the position B on the end point side of the outer cam groove 55. That is, a little before the quantity of the drawn-out webbing reaches the maximum (whole amount), as shown in FIGS. 10(a) and 10(b), the guide pin 23a is beyond the end position B and on the inclined surface 58 of the step portion 57. FIG. 10(a) shows an exploded plan view of the state where the guide pin 23a has run onto the step portion 57, and FIG. 10(b) shows a sectional view of the portion taken on X—X line in the same drawing.

If the webbing is further drawn out, as shown in FIGS. 11(a) and 11(b), the guide pin 23a goes beyond the step portion 57, and enters the switching area 52. If the webbing is intended to be further drawn out thereafter, the guide pin 23a moves along the cam surface 61 constituting the side wall of the switching area 52. In this state, the webbing can be still drawn out.

After substantially the whole amount of the webbing is drawn out, if winding is started in the state where the guide pin 23a is located in the switching area 52, the control plate 22 begins to rotate in the direction ($Y_2$ direction) opposite to the direction of the rotation performed till then. Then, the guide pin 23a contacts with the step surface 59 or with the cam surface 60 continuously extended from the step surface 59 to the inner cam groove 56 so that the guide pin 23a is guided to the inner cam groove 56 (refer to FIG. 12).

When the guide pin 23a moves to the cam surface 60, the second lock convex portion 23f of the operation mode switching lever 23 is made to go over the first lock convex portion 34 of the sensor cover 30 by the repulsion between the first lock convex portion 34 and the second lock convex portion 23f, so that the guide pin 23a enters the inner cam groove 56. At this time, the inner cam groove 23d of the operation mode switching lever 23 pushes the engagement projection 24b of the lock arm 24, so that the engagement portion 24a of the lock arm 24 engages with the teeth of the ratchet plate 4a as shown in FIGS. 12 to 16, and the operation mode of the inertia detecting device 31 is switched from the ELR mode to the ALR mode.

Figure 13:
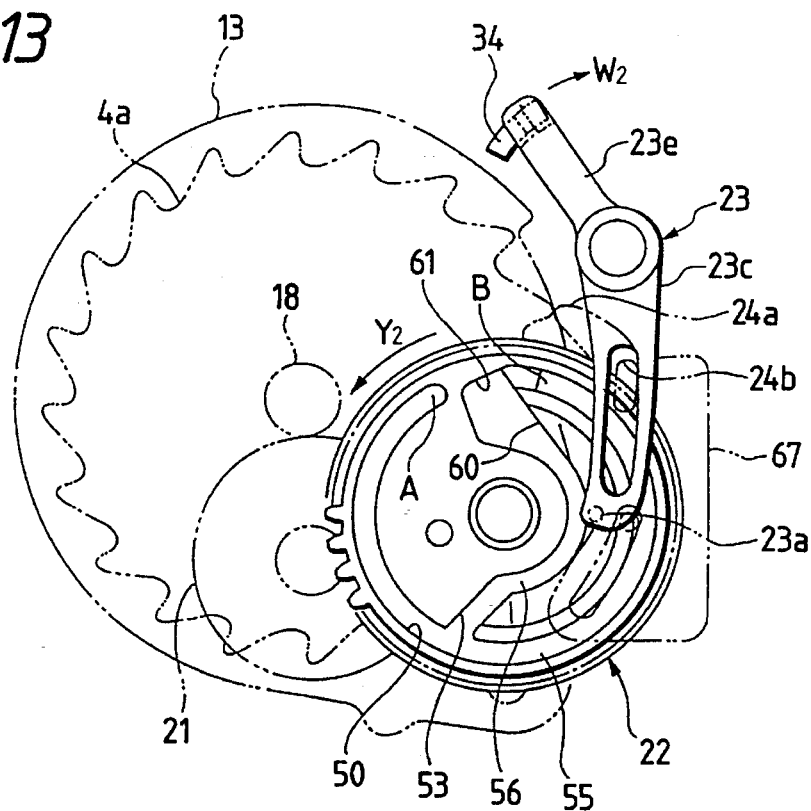
FIG. 13 is a diagram for explaining the operation mode of the inertia detecting device in accordance with a change of the state of the wound webbing according to the first embodiment of the present invention, illustrating the state where the guide pin contacts with an inclined surface.

FIGS. 12 and 13 show the state where winding the webbing is advanced in the ALR mode. That is, the ALR mode is continued while the guide pin 23a of the operation mode switching lever 23 is being guided by the inner cam groove 56.

Figure 17:
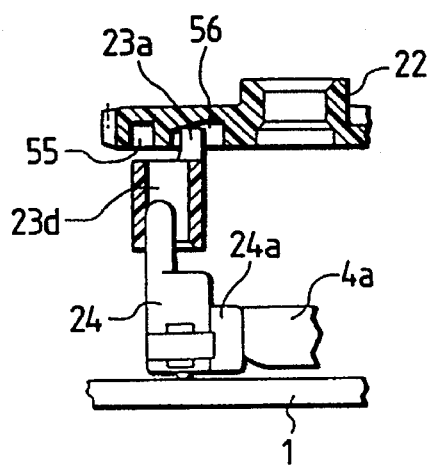
FIG. 17 is a diagram for explaining the operation of the lever in the ALR mode state at the time of winding a webbing according to the first embodiment of the present invention.
Figure 20:
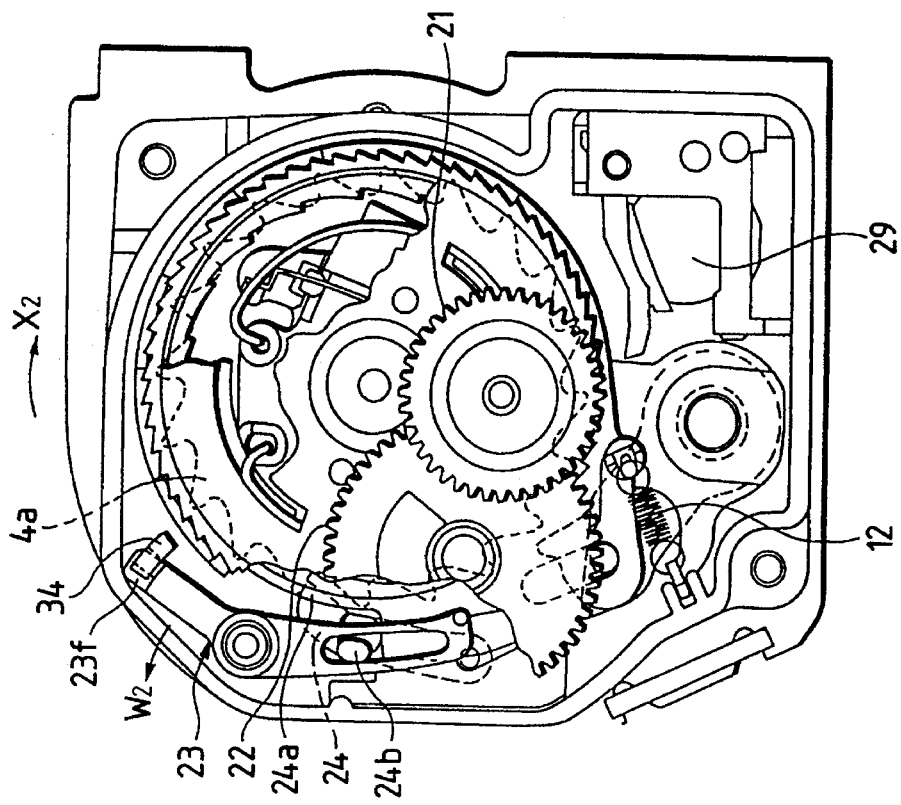
FIG. 20 is a diagram for explaining a non-lock state in an ALR mode according to the first embodiment of the present invention.

If the webbing is started to be wound on the winding shaft 4 in this ALR mode, as shown also in FIG. 20, the winding shaft 4 begins to rotate in the direction of the arrow $X_2$, and the ratchet plate 4a also rotates in the same direction. However, the engagement portion 24a of the lock arm 24 engaging with the teeth of the ratchet plate 4a is pivoted to go beyond the teeth of the ratchet plate 4a, so that there is no fear that the lock arm 24 prevents the winding shaft 4 from rotating. When the engagement portion 24a goes beyond the ratchet plate 4a, as shown in FIGS. 13 and 17, the guide pin 23a of the operation mode switching lever 23 is moved, together with the lock arm 24, in the inner cam groove 56 toward the outer cam groove 55 (in the outward radial direction of the control plate 22). However, since the side wall of the inner cam groove 56 is constituted by the suitably inclined surface 51, it is possible to give an urging to the guide pin 23a to thereby restrict the guide pin 23a from moving in the outward radial direction of the control plate 22. When the engagement portion 24a of the lock arm 24 goes beyond the ratchet plate 4a, the lock arm 24 is urged in the direction of engagement with the ratchet plate 4a by the urging force in the direction of the arrow $W_2$ acting on the operation mode switching lever 23 by the repulsion between the first lock convex portion 34 and the second lock convex portion 23f. As a result, the engagement between the teeth of the ratchet plate 4a and the engagement portion 24a is maintained, so that there is no fear that the ALR mode is released.

Figure 21:
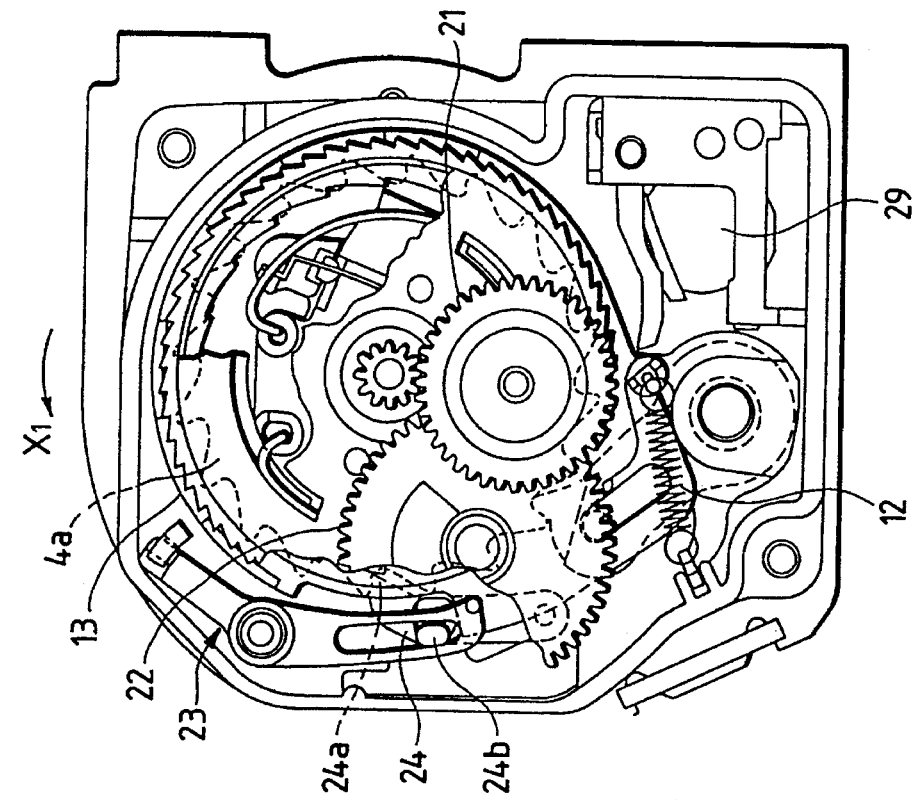
FIG. 21 is a diagram for explaining a lock state in the ALR mode according to the first embodiment of the present invention.

On the other hand, if the webbing is drawn out of the retractor in the operation state of the ALR mode so that the winding shaft 4 begins to rotate in the direction of the arrow $X_1$ as shown in FIGS. 12 and 21, the lock arm 24 engaging with the ratchet plate 4a is urged counterclockwise in FIG. 21. Therefore, the lock arm 24 slides in the long hole 69 of the guide member 67 by use of the engagement pin 68 thereof as a fulcrum. At that time, the lock arm 24 pushes the ratchet cup 13 by an expanded portion 24c on the base side of the engagement projection 24b thereof so that, at the same time the ratchet cup 13 also rotates in the direction of the arrow $X_1$ (that is, the direction of rotation of the winding shaft 4) against the urging force of the return spring 12. When the ratchet cup 13 rotates in the direction of the arrow $X_1$, the rotation in the direction of the arrow $Z_1$ (refer to FIG.

6) is produced in the pawl 11 through the pawl guide projection 11b engaging with the pawl guide hole 13c of the ratchet cup 13. Consequently, the pawl 11 engages with the ratchet plate 4a so as to enter the lock state where the webbing is prevented from being drawn out.

Figure 14:
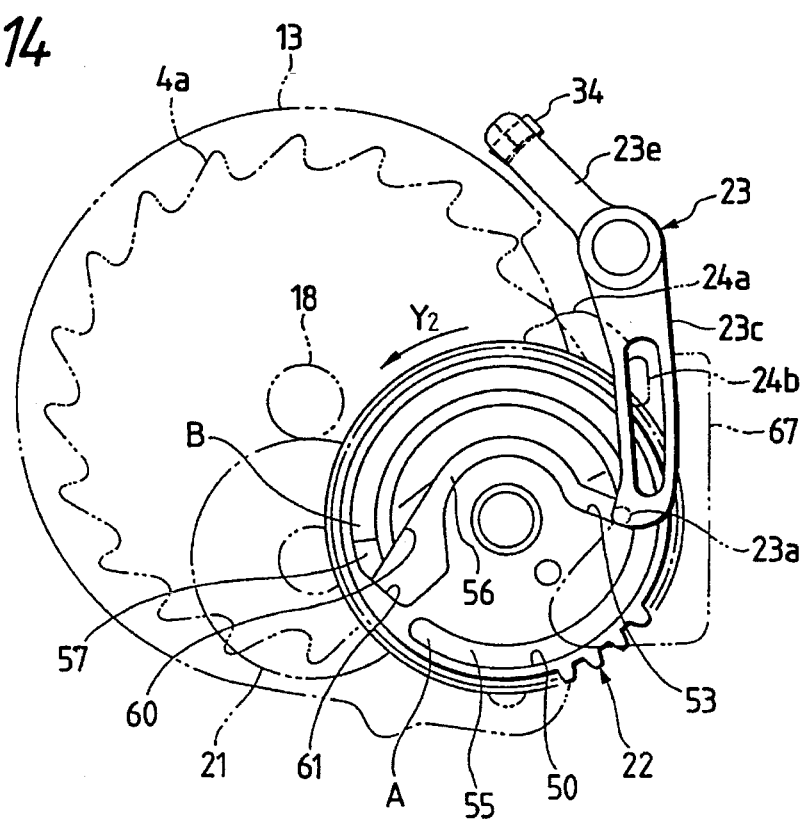
FIG. 14 is a diagram for explaining the operation mode of the inertia detecting device in accordance with a change of the state of the wound webbing according to the first embodiment of the present invention.

If the webbing is further wound in the state of FIG. 13 in the ALR mode, the control plate 22 further rotates in the direction of the arrow $Y_2$, so that the guide pin 23a of the operation mode switching lever 23 is guided by the inner cam groove 56 to thereby move onto the cam surface 53 at the end point of the inner cam groove 56. If the webbing is further wound, the guide pin 23a contacts with the cam surface 53 as shown in FIG. 14, and is returned to the outer cam groove 55 by the cam surface 53.

At this time, the second lock convex portion 23f formed in the swinging end portion of the flexible arm portion 23e of the operation mode switching lever 23 goes beyond the top of the first lock convex portion 34, so that the direction of the repulsion between the first lock convex portion 34 and the second lock convex portion 23f is changed. Accordingly, the direction of the urging force acting on the operation mode switching lever 23 is switched to the direction where the guide pin 23a is pushed onto the side wall 50 of the outer cam groove 55. The urging force makes the lock arm 24 swing away from the ratchet plate 4a through the engagement projection 24b engaging with the inner cam groove 23d so that the engagement portion 24a of the lock arm 24 is released from engaging with the ratchet plate 4a. As a result, the operation mode is switched from the ALR mode to the ELR mode. If the webbing is further wound in this state, and the whole amount of the webbing is wound up, the state returns to the above-mentioned initial state shown in FIG. 9.

After the whole amount of the webbing is drawn out again, until the guide pin 23a of the operation mode switching lever 23 enters the switching area 52 or immediately after the guide pin 23a enters the switching area 52, the ELR mode is maintained. After that, if the guide pin 23a contacts with the cam surface 60 by the succeeding winding, as mentioned above, the operation mode is switched from the ELR mode to the ALR mode. This ALR mode is continued until the guide pin 23a is moved to the outer cam groove 55 by the cam surface 53 of the inner cam groove 56.

Thus, in the seat belt retractor according to the first embodiment, with respect to the switching of the operation mode switching lever 23 from the ELR mode position to the ALR mode position, the guide pin 23a is located in the switching area 52 when the quantity of winding reaches a predetermined value after almost the whole amount of the webbing is drawn out so that the guide pin 23a can move only to the ALR mode (by the effect of the structure of the step surface 59 and so on), and it is therefore extremely sure to perform the switching of the operation mode from the ELR mode to the ALR mode. In addition, when this seat belt retractor is assembled, the above-mentioned switching of the operation mode can be performed if the guide pin 23a can be disposed in the switching area 52 which is comparatively large so that it is possible to improve the performance of the assembling.

In addition, it is possible to prevent the production of operation faults of an automatic lock function caused by a conventional operation mode switching lever 23 stopping near a neutral position. Therefore, when the webbing is used for attaching a baggage, a child seat or the like onto a seat, there is no fear that the seat belt retractor is released from the automatic lock state and returns to the emergency lock state by vibration, shock or the like during the running of a vehicle. Accordingly, it is possible to surely prevent the webbing from being gradually drawn out of the retractor during the running of the vehicle to thereby loosen the attachment of the baggage, the child seat or the like.

Figure 22:
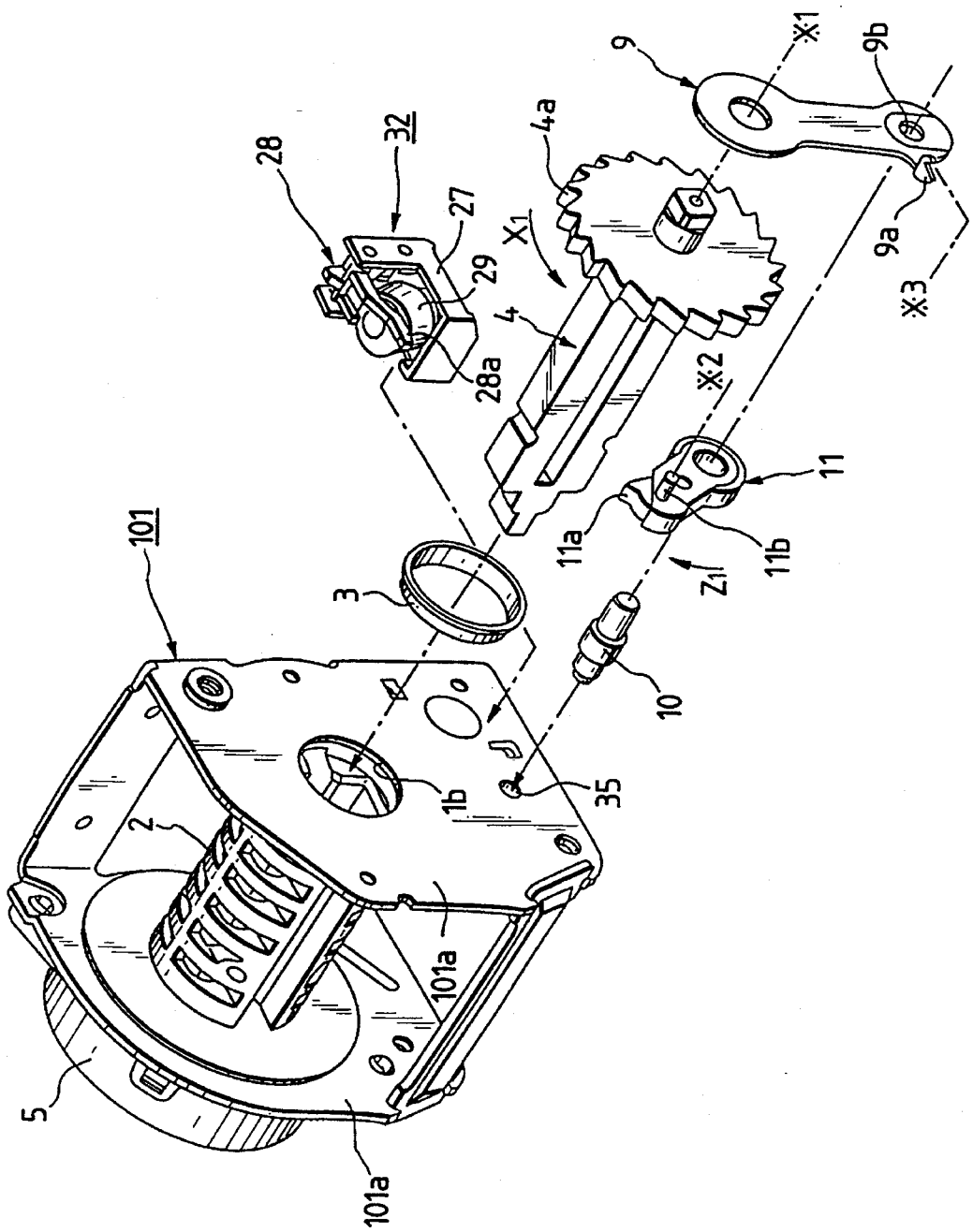
FIG. 22 is a part of an exploded perspective view illustrating the seat belt retractor according to a second embodiment of the present invention.
Figure 23:
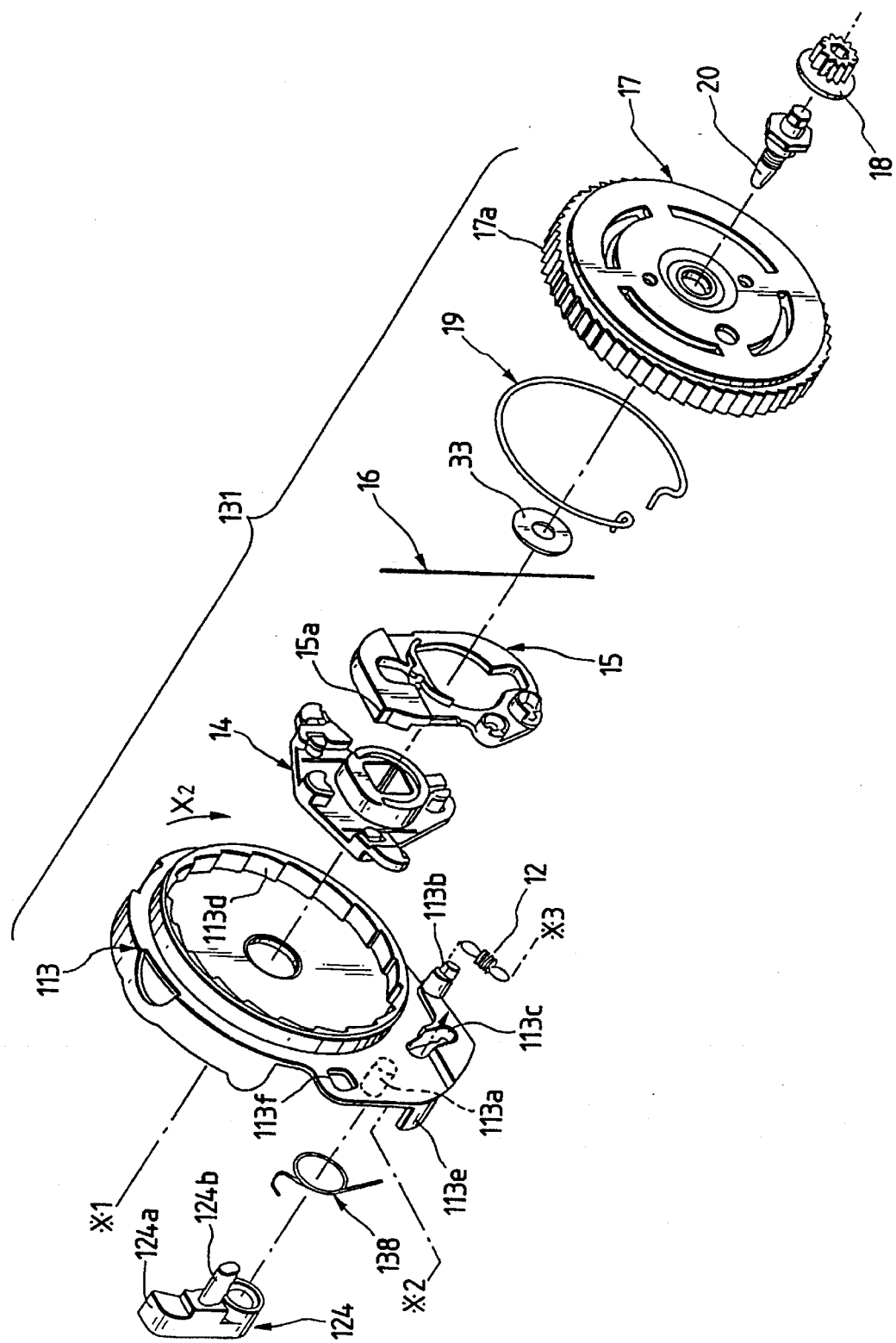
FIG. 23 is a part of the exploded perspective view illustrating the seat belt retractor according to the second embodiment of the present invention.
Figure 24:
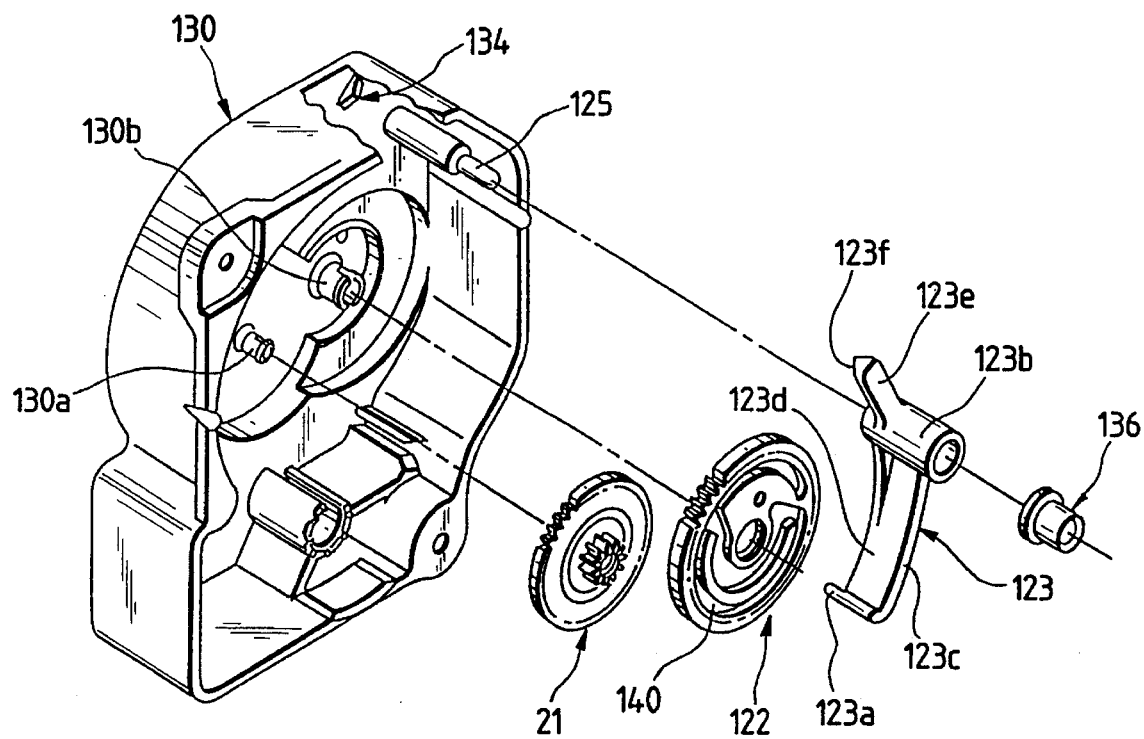
FIG. 24 is a part of the exploded perspective view illustrating the seat belt retractor according to the second embodiment of the present invention.

FIGS. 22 to 24 are exploded perspective views of a seat belt retractor according to a second embodiment of the present invention. The detailed description of the constituent parts the same as those in the first embodiment will be omitted here.

Figure 25:
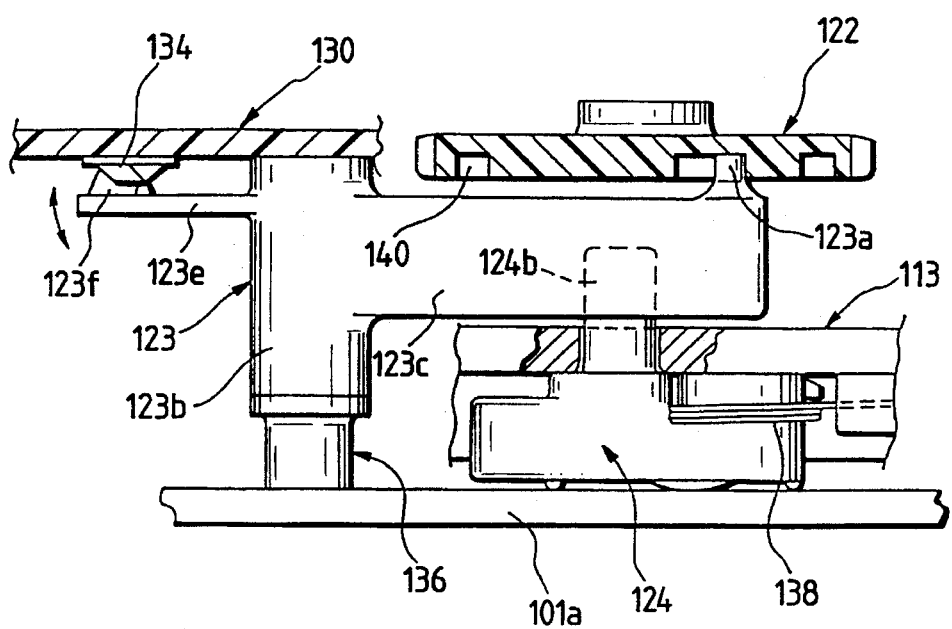
FIG. 25 is a schematic diagram illustrating the structure of the operation mode switching lever and a control plate shown in FIG. 24.

As shown in FIG. 24, an operation mode switching lever 123 which is a lever member made of synthetic resin is swingably pivoted on a pivot 125 projectingly provided on the inner wall of a sensor cover 130. The operation mode switching lever 123 is constituted by a cylindrical portion 123b loosely fitted to the pivot 125, a cam arm 123c extended from the cylindrical potion 123b toward the outside in the radial direction, and a flexible arm portion 123e extended toward the outside in the radial direction oppositely to the cam arm portion 123c. A guide pin 123a which is an engage portion projectingly provided on a swinging end portion of the cam arm portion 123c engages with a guide groove 140 of a control plate 122 so that the operation mode switching lever 123 can swing along the cam surface of the guide groove 140. As shown in FIG. 25, a second lock convex portion 123f having a triangular section and formed in the swinging end portion of the flexible arm portion 123e engages with a first lock convex portion 134 having a triangular section and projecting on the inner wall of the sensor cover 130 so as to constitute an urging device by which an urging force can be given to the operation mode switching lever 123 so that the direction of the urging force is changed properly with a neutral position as a border by the effect of the elastic force of the flexible arm portion 123e in the direction of axis of rotation, and the drag of the inclined surfaces pressed to each other in opposition to each other. Thus, the operation mode switching lever 123 is swingable with a pivot 125 as a center and is urged to each end of the swinging.

Figure 26:
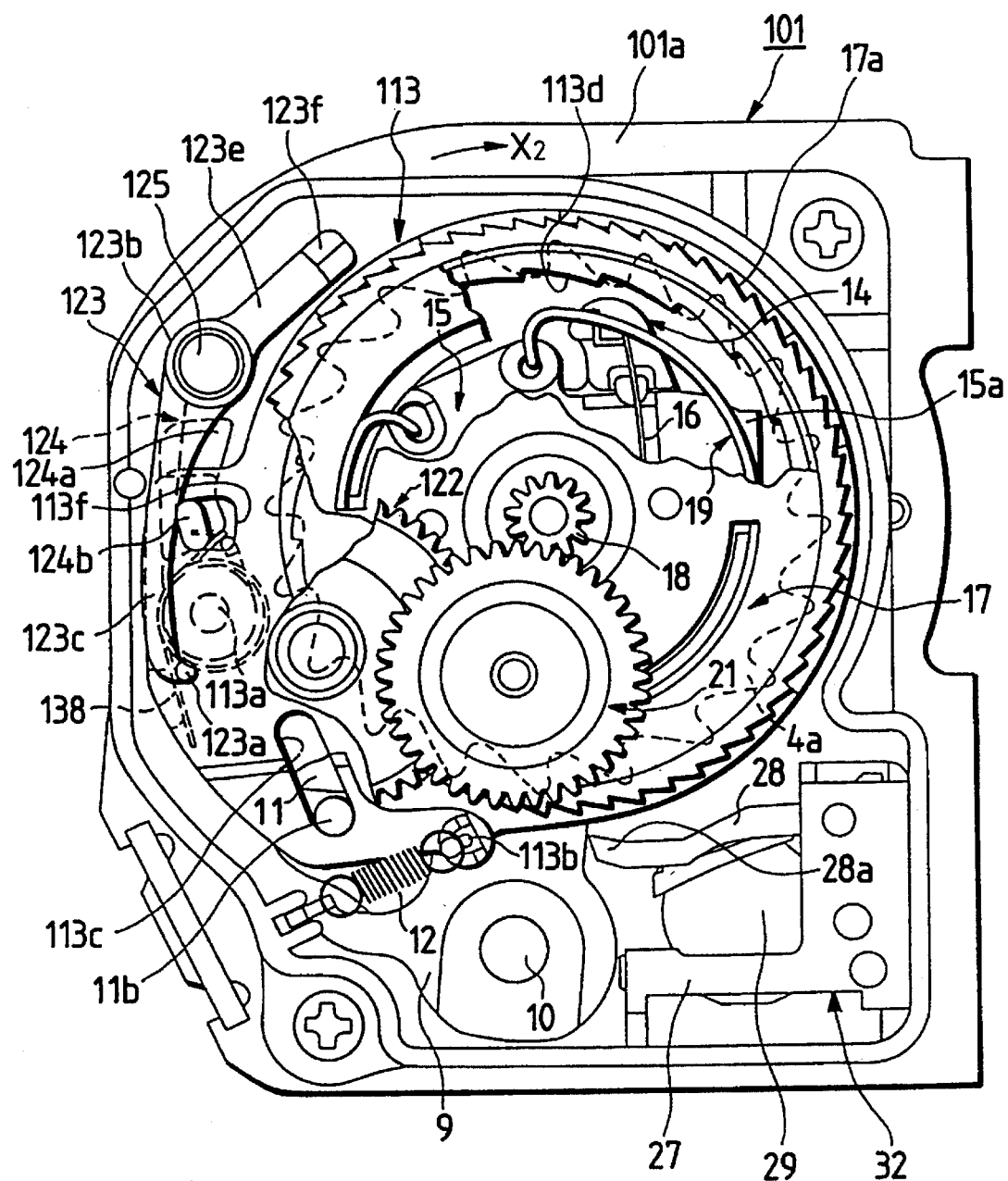
FIG. 26 is a main portion expanded side view for explaining the operation of the seat belt retractor shown in FIGS. 22 to 24.

Further, an engagement projection 124b of the lock arm 124 swingably pivoted on the pivot 113a provided so as to project toward the inside of a ratchet cup 113 is made engageable through an opening 113f of the ratchet cup 113, with an inner cam surface 123d of the cam arm portion 123c. The swinging end of the lock arm 124 is urged away from the rotation center of the winding shaft 4 by a torsion coil spring 138 one end portion of which is engaged with a lock piece 113e projectingly provided on the ratchet cup 113. The lock arm 124 is moved with the pivoting of the operation mode switching lever 123 at the position where an engagement portion 124a thereof engages with the teeth of the ratchet plate 4a so that an inertia detecting device 131 is started up as a lock device driving mechanism, or at the position where the engagement portion 124a does not engage with the teeth of the ratchet plate 4a so that the inertia detecting device 131 is not started up as a lock device driving mechanism (refer to FIG. 26). Thus, the lock arm 124 can take the two first and second positions where the lock arm 124 engages or does not engage with the ratchet plate 4a, respectively. The swing region of the lock arm 124 is restricted by the opening 113f of the ratchet cup 113.

Figure 27:
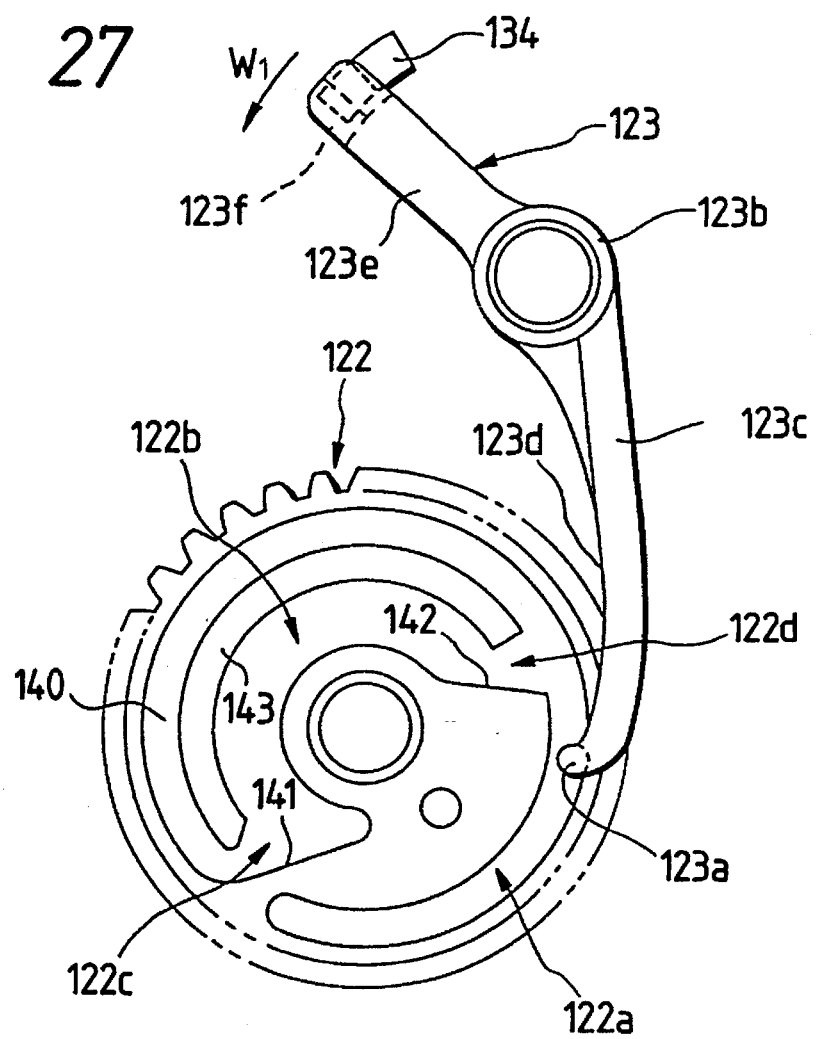
FIG. 27 is a front view illustrating the operation mode switching lever and the control plate shown in FIG. 24.

As shown in FIG. 27, the guide groove 140 of the control plate 122 is constituted by an outer cam groove 122a which is a first cam groove for positioning a guide pin 123a of the operation mode switching lever 123 near the outer circumference of the control plate 122 so as to hold the lock arm 124 in the position where the lock arm 124 does not engage with the ratchet plate 4a; an inner cam groove 122b which is a second cam groove for positioning a guide pin 123a near the inner circumference of the control plate 122 so as to hold the lock arm 124 in the position where the lock arm 124 engages with the ratchet plate 4a; a notch portion 122c which is a switching area for introducing the guide pin 123a from the outer cam groove 122a to the inner cam groove 122b when a webbing is drawn out by the quantity equal or more than a predetermined value; and a notch portion 122d which is a connection portion for moving the guide pin 123a from the inner cam groove 122b to the outer cam groove 122a when the webbing is wound by a predetermined quantity after that.

Figure 28:
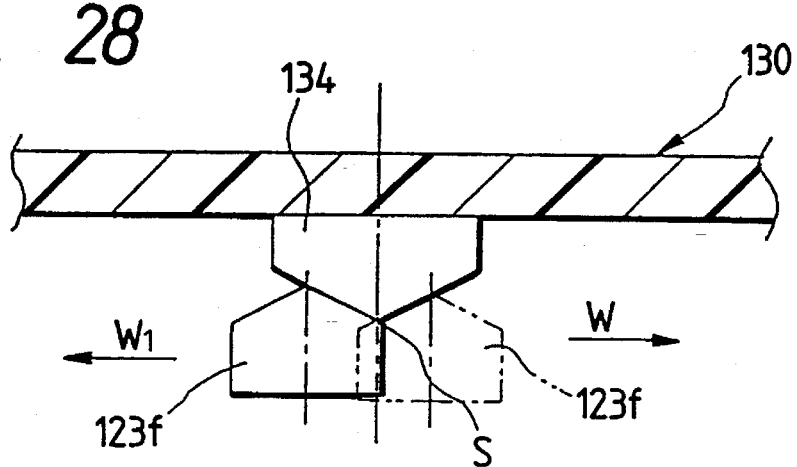
FIG. 28 is a main portion expanded sectional view for explaining the engagement state between an engagement convex portion of the operation mode switching lever and an engagement and locking convex portion of the sensor cover according to the second embodiment of the present invention.
Figure 29A:
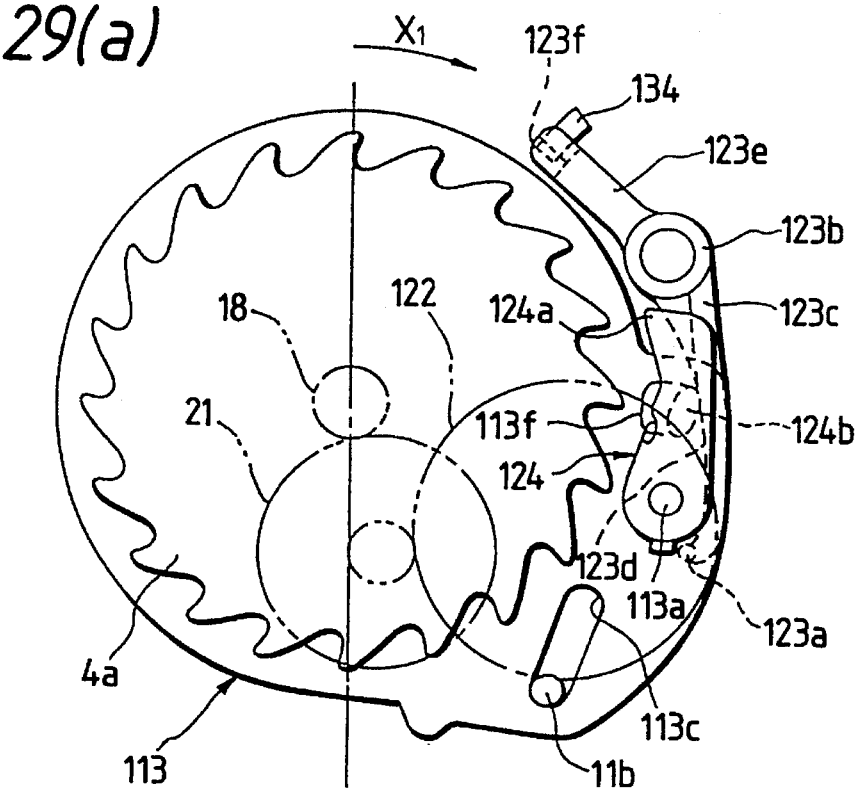
FIG. 29(a) is a diagram for explaining the operation mode of the inertia detecting device in accordance with a change of the state of a wound webbing according to the second embodiment of the present invention.
Figure 29B:
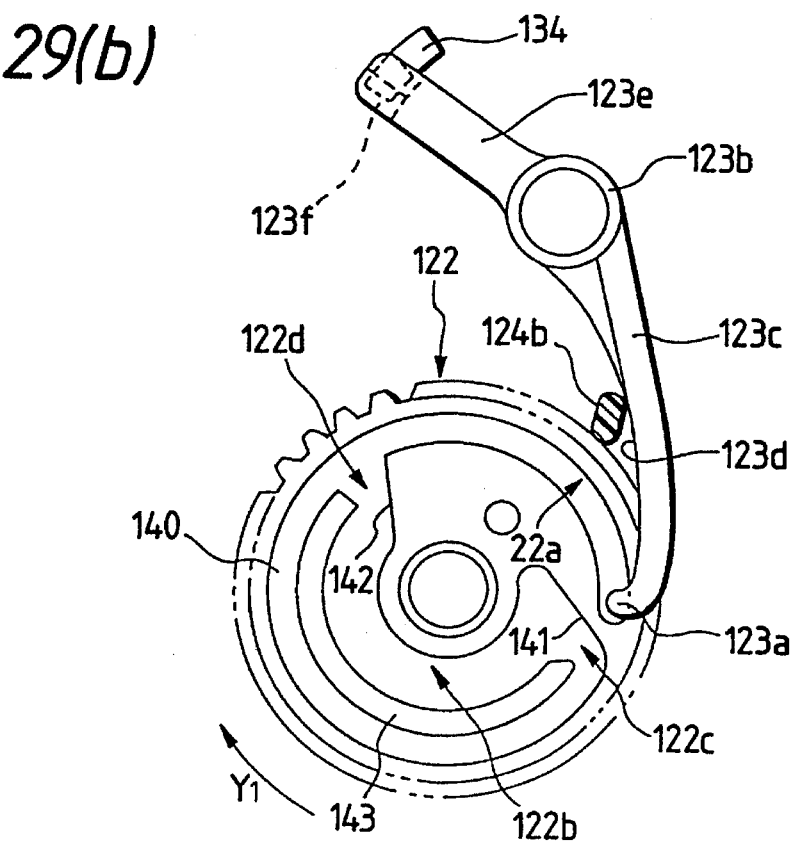
FIG. 29(b) is a front view illustrating the engagement state between the operation mode switching lever and the control plate as shown in FIG. 29(a)

The outer cam groove 122a is extended almost all over the circumference in the vicinity of the outer circumference of the control plate 122, and the inner cam groove 122b is extended almost over a half of the circumference in the inner side than the outer cam groove 122a. When the guide pin 123a of the operation mode switching lever 123 is located in the outer cam groove 122a, the second lock convex portion 123f of the operation mode switching lever 123 disposed in the position shown by the continuous line in FIG. 128 has a repulsion for the first lock convex portion 134 of the sensor cover 130 so as to urge the operation mode switching lever 123 counterclockwise (in the direction of the arrow $W_1$) in FIG. 27. When the guide pin 123a is located in the inner cam groove 122b, the second lock convex portion 123f is moved beyond a top S of the first lock convex portion 134 which is a neutral position so as to be disposed in the position shown by the two-dots chain line in FIG. 28. Accordingly, the second lock convex portion 123f has a repulsion against the first lock convex portion 134 of the sensor cover 130 so as to urge the operation mode switching lever 123 clockwise (in the direction of the arrow $W_2$) in FIG. 27.

That is, these inner and outer cam grooves 122b and 122a are separated by a partition 143, so that there is no fear that the guide pin 123a disposed in either one of the cam grooves goes beyond the partition 143 and moves to the other cam groove unexpectedly.

Next, the operation of the seat belt retractor according to the second embodiment will be described.

In the same manner as in the first embodiment, while the guide pin 123a of the operation mode switching lever 123 is guided by the outer cam groove 122a of the control plate 122, the inertia detecting device 131 is not operated, and the ELR mode is maintained. That is, the webbing can be drawn out freely.

If tension is given to the webbing (not shown) in case of emergency such as a collision or the like so that an impacting rotation force in the webbing draw-out direction (the direction of the arrow $X_1$) stronger than a predetermined value acts on the winding shaft 4, then the inertia detecting device 131 is operated in the same manner as in the first embodiment so that the pawl 11 engages with the ratchet plate 4a, and as a result, the lock state is produced so as to prevent the rotation of the winding shaft 4 in the direction of the arrow $X_1$, that is, to prevent the draw-out of the webbing. When the ratchet cup 13 is rotated in the direction of the arrow $X_1$, the lock arm 124 pivoted on the pivot 13a of the ratchet cup 13 is also rotated together with the ratchet cup 13. However, the lock arm 124 is urged away from the rotation center of the winding shaft 4 by the torsion coil spring 138 so that the lock arm 124 does not engage with the ratchet plate 4a.

Figure 30A:
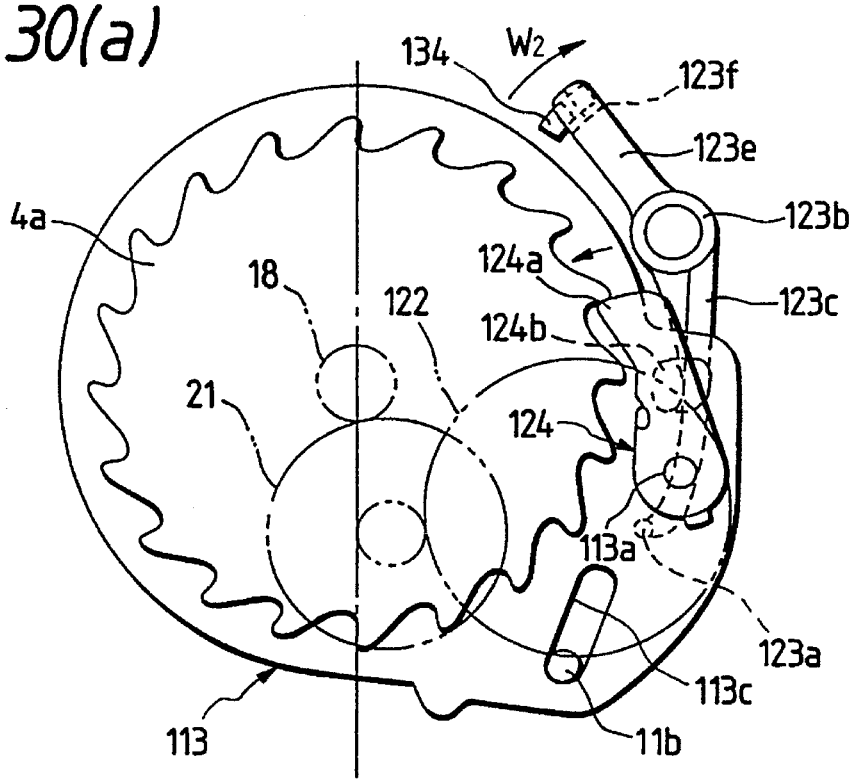
FIG. 30(a) is a diagram for explaining the operation mode of the inertia detecting device in accordance with a change of the state of the wound webbing according to the second embodiment of the present invention.
Figure 30B:
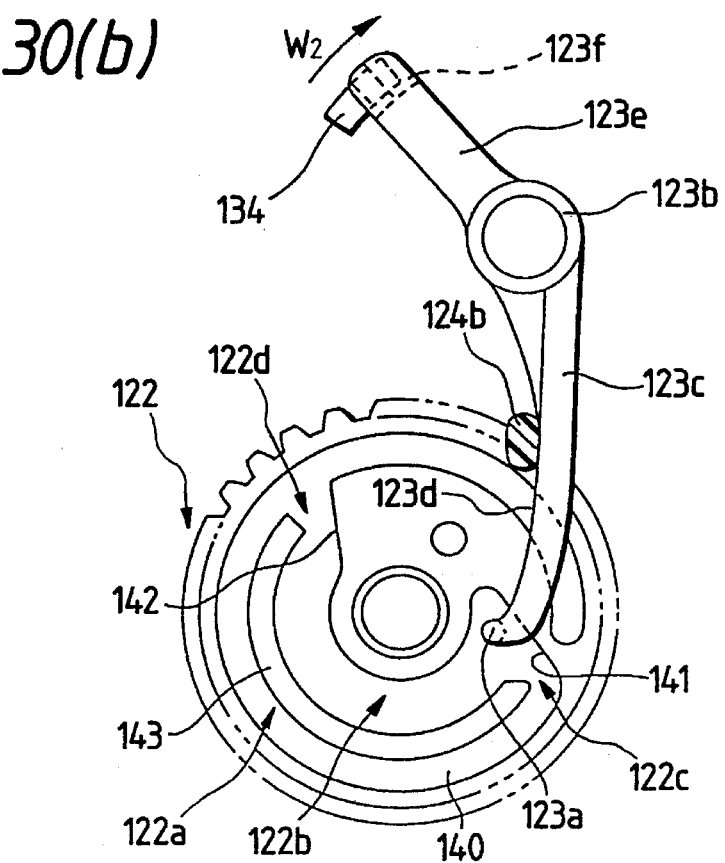
FIG. 30(b) is a front view illustrating the engagement state between the operation mode switching lever and the control plate as shown in FIG. 30(a)

Next, if the whole amount of the webbing is drawn out, as shown in FIG. 30(b), the guide pin 123a of the operation mode switching lever 123 is pushed by a cam surface 141 of the notch portion 122c so as to enter the inner cam groove 122b. At the same time, the operation mode switching lever 123 is made to swing clockwise (in the direction of the arrow $W_2$) in FIGS. 30(a) and 30(b). At this time, since the second lock convex portion 123f formed in the swinging end portion of the flexible arm portion 123e goes beyond the top S of the first lock convex portion 134, the direction of the repulsion between these first lock convex portion 134 and second lock convex portion 123f is changed so that the cam arm portion 123c urges the lock arm 124 in the direction where the lock arm 124 engages with the ratchet pate 4a. Consequently, in FIG. 30(a) where the repulsion between the second lock convex portion 123f and the first lock convex portion 134 acts on the operation mode switching lever 123, the engagement portion 124a is engaged with the teeth of the ratchet plate 4a by the urging force added clockwise (in the direction of the arrow $W_2$).

Figure 31A:
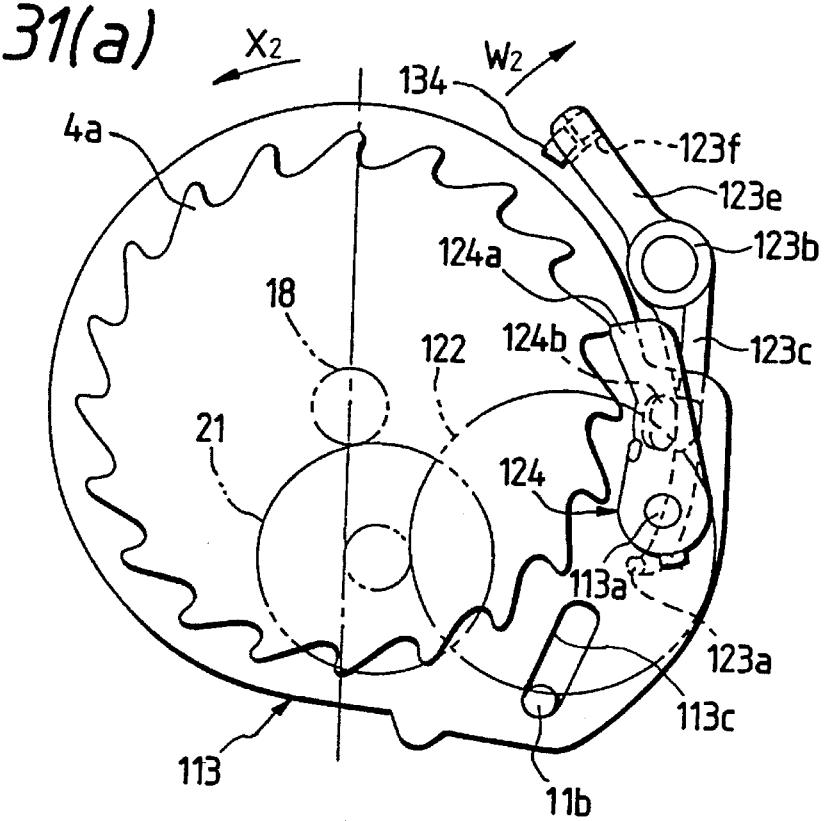
FIG. 31(a) is a diagram for explaining the operation mode of the inertia detecting device in accordance with a change of the state of the wound webbing according to the second embodiment of the present invention.
Figure 31B:
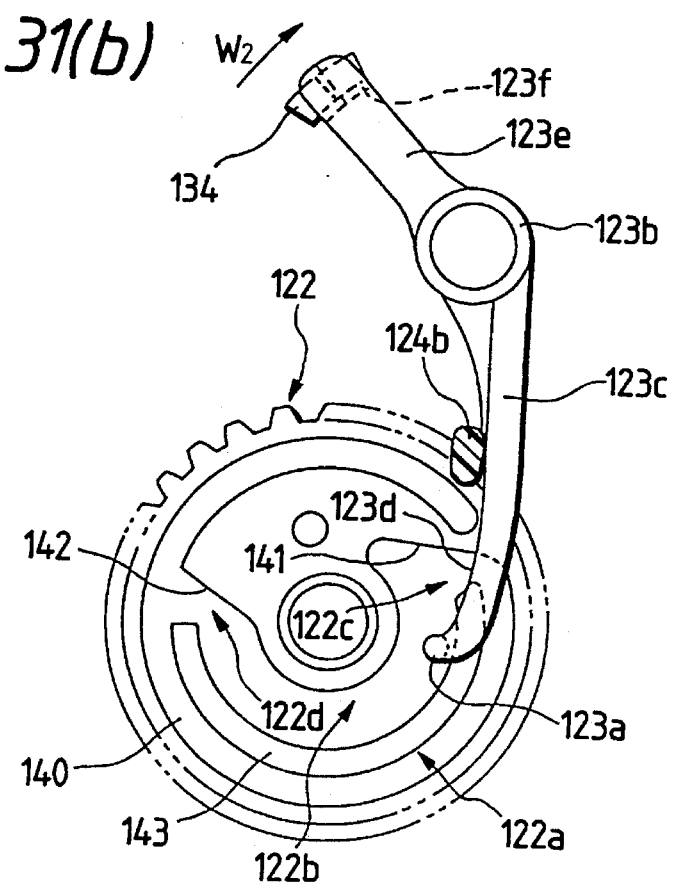
FIG. 31(b) is a front view illustrating the engagement state between the operation mode switching lever and the control plate as shown in FIG. 31(a)
Figure 35:
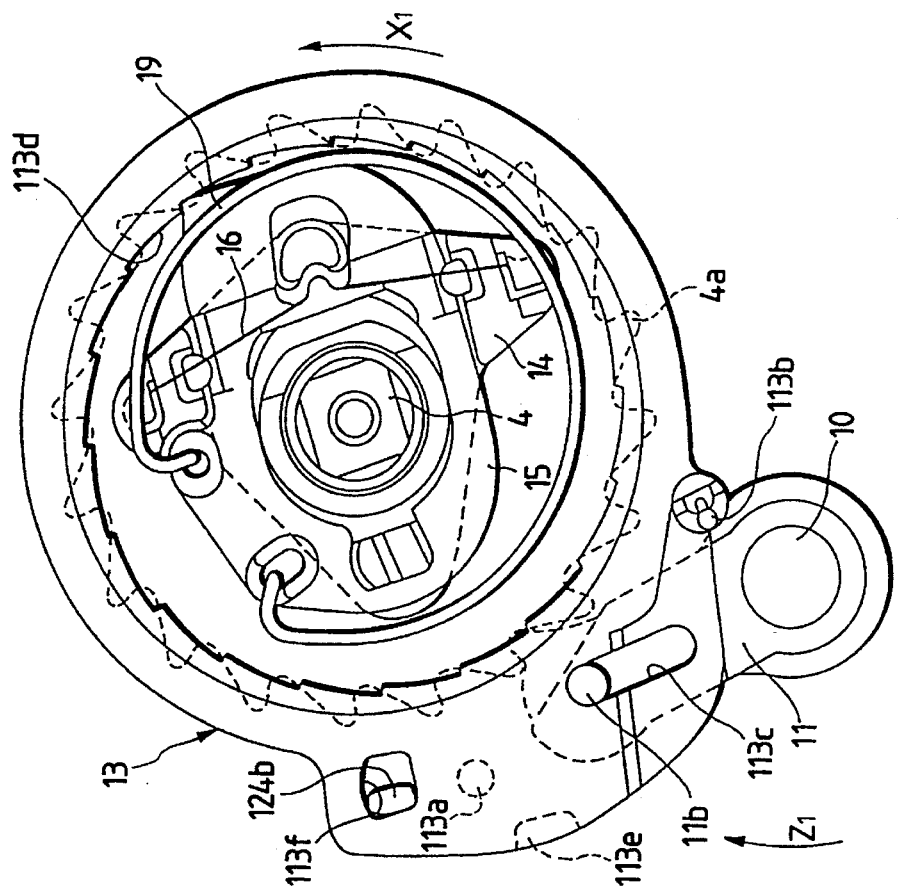
FIG. 35 is a main portion expanded diagram for explaining the operation of locking the webbing drawn out according to the second embodiment of the present invention.

If the webbing begins to be wound by the retractor, as shown in FIG. 31(a), then the winding shaft 4 begins to rotate in the direction of the arrow $X_2$, and the ratchet plate 4a also rotates in the same direction. However, the engagement portion 124a of the lock arm 124 engaging with the teeth of the ratchet plate 4a is pivoted to go over the teeth of the ratchet plate 4, so that there is no fear that the lock arm 124 prevents the winding shaft 4 from rotating. At this time, the lock arm 124 is urged in the direction to engage with the ratchet plate 4a by the urging force in the clockwise direction (the direction of the arrow $W_2$) in FIGS. 31(a) and 31(b) which acts on the operation mode switching lever 123 by the repulsion between the first lock convex portion 134 and the second lock convex portion 123f. Accordingly, the engagement between the teeth of the ratchet plate 4a and the engagement portion 124a is maintained. Further, at this time, the cam arm portion 123c of the operation mode switching lever 123 is also pivoted by the teeth of the ratchet plate 4a through the engagement projection 124b of the lock arm 124. However, as shown in FIG. 31(b), the guide pin 123a of the pivoted cam arm portion 123c is restricted by the outer side wall of the inner cam groove 122b so that the guide pin 123a cannot go over the partition 143. Accordingly, there is no fear that the urging force acting clockwise (in the direction of the arrow $W_2$) onto the operation mode switching lever 123 is released.

Figure 32:
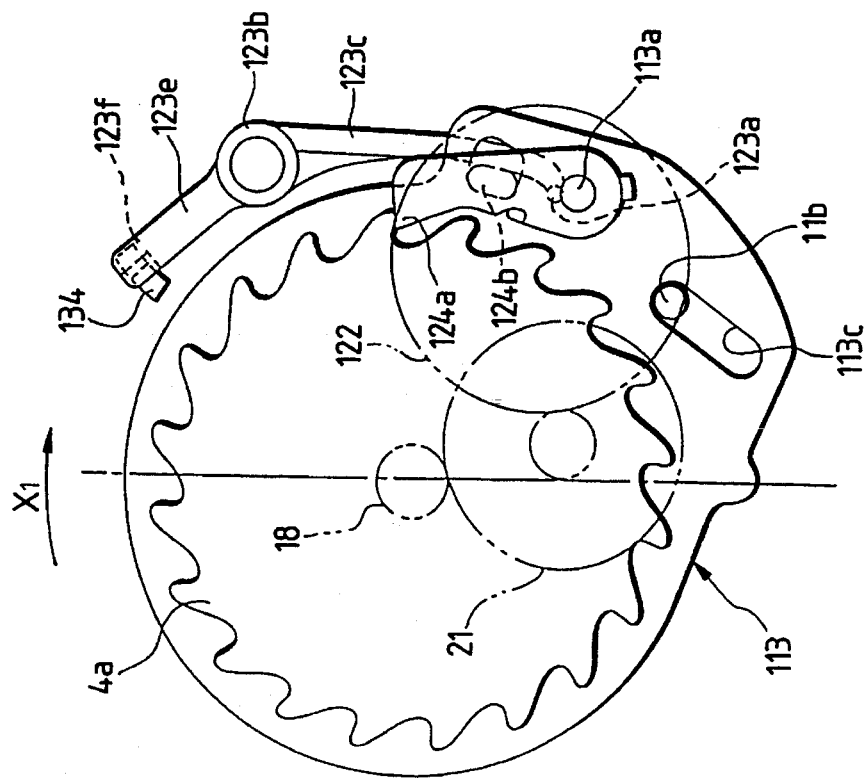
FIG. 32 is a diagram for explaining the operation mode of the inertia detecting device in accordance with a change of the state of the wound webbing according to the second embodiment of the present invention.
Figure 33:
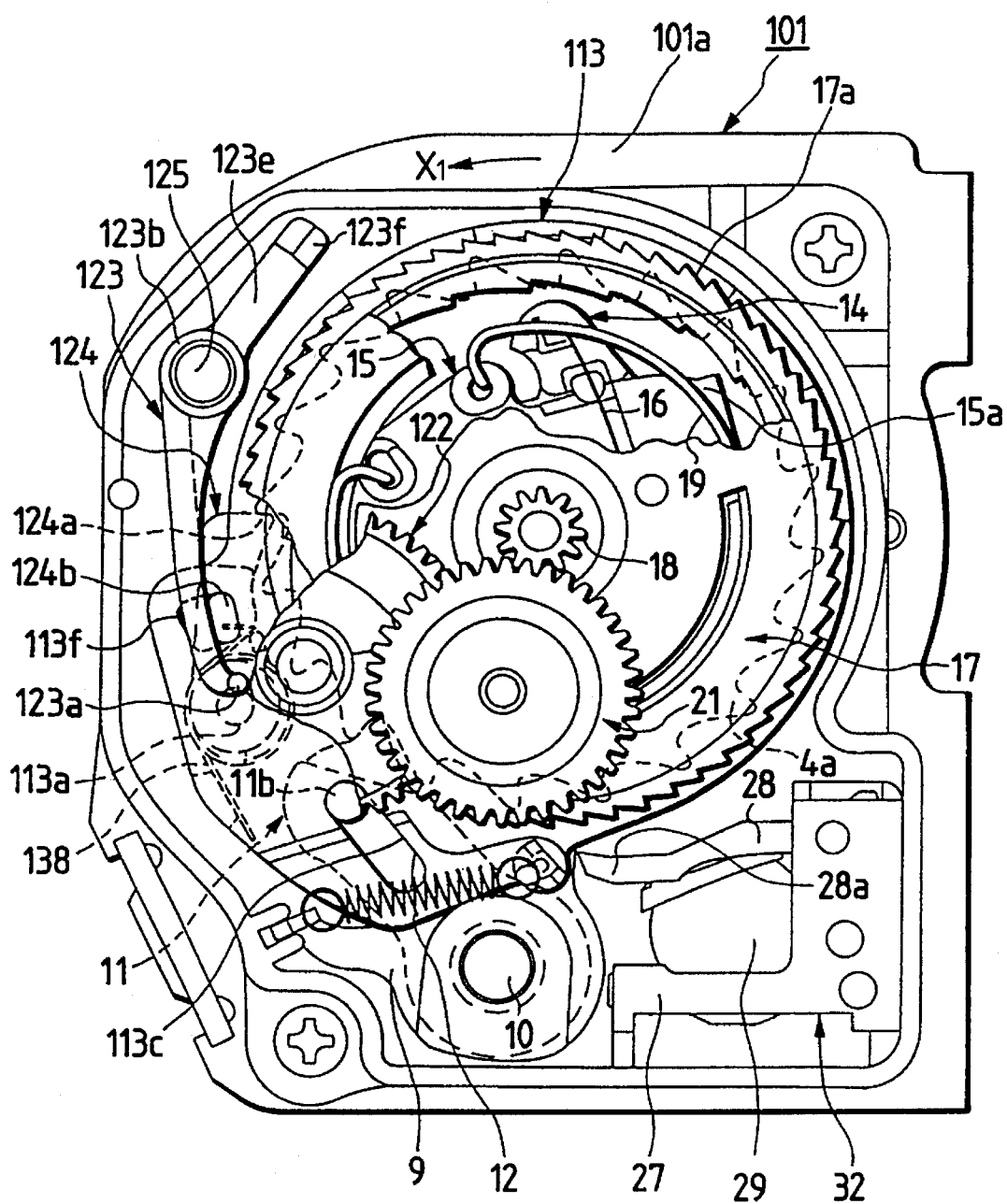
FIG. 33 is a diagram for explaining a lock state in the ALR mode according to the second embodiment of the present invention.

On the other hand, if the webbing is drawn out of the retractor so that the winding shaft 4 begins to rotate in the direction of the arrow $X_1$, then the rotation force of the winding shaft 4 is transmitted to the ratchet cup 113 through the lock arm 124 engaging with the ratchet plate 4a as shown in FIG. 32. Accordingly, the inertia detecting device 131 is operated to rotate the ratchet cup 113 in the direction of the arrow $X_1$ against the urging force of the return spring 12. At this time, a pawl guide hole 113c engaging with the pawl guide projection 11b rotates the pawl 11 in the direction of the arrow $Z_1$ through the pawl guide projection 11b so as to make the pawl 11 engage with the ratchet plate 4a (refer to FIG. 33). As a result, the rotation in the direction of the arrow $X_1$ of the winding shaft 4, that is, the draw-out of the webbing is prevented and locked.

Thus, while the guide pin 123a is located in the inner cam groove 122b of the control plate 122, the engagement portion 124a of the lock arm 124 always engages with the teeth of the ratchet plate 4a so that the automatic lock mechanism is being in the operating state.

Figure 34A:
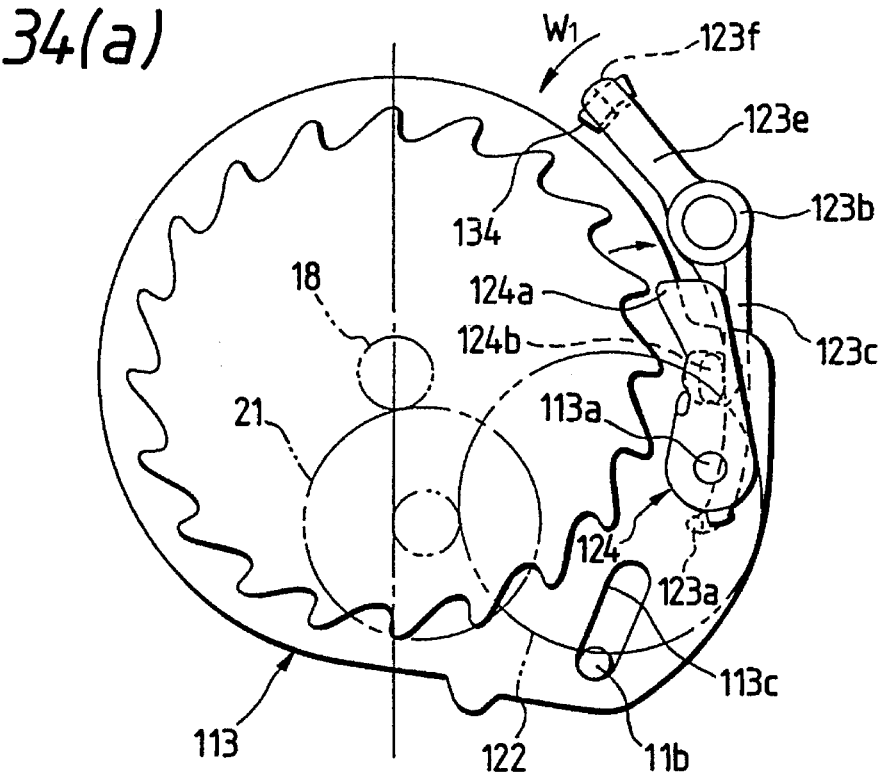
FIG. 34(a) is a diagram for explaining the operation mode of the inertia detecting device in accordance with a change of the state of the wound webbing according to the second embodiment of the present invention.
Figure 34B:
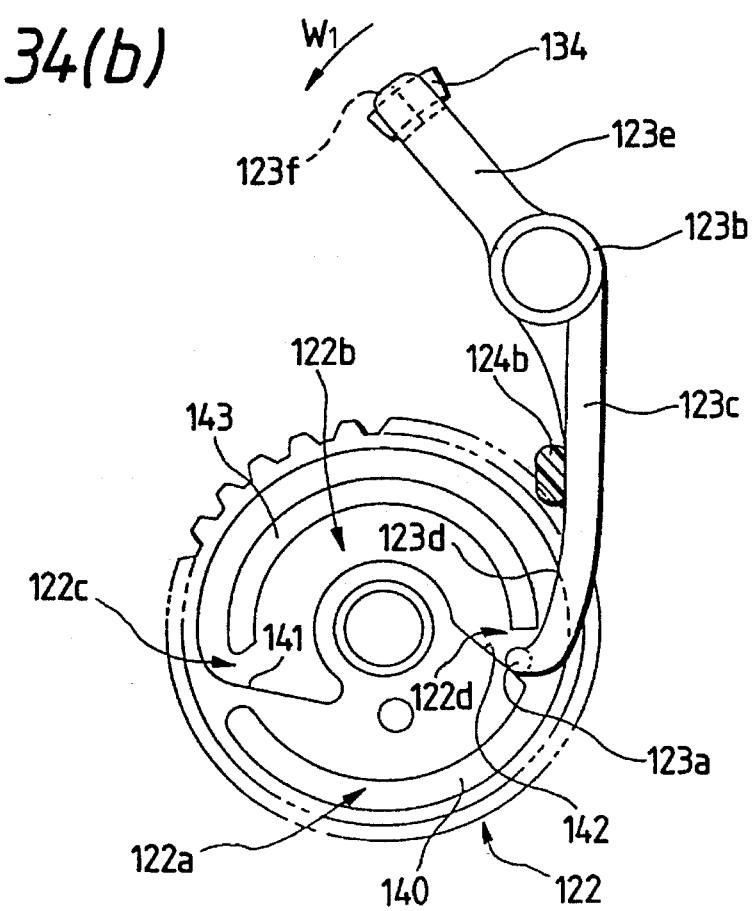
FIG. 34(b) is a front view illustrating the engagement state between the operation mode switching lever and the control plate as shown in FIG. 34(a)

If the webbing is further wound in this state, the control plate 122 begins to rotate in the direction of the arrow $Y_2$, so that the guide pin 123a of the operation mode switching lever 123 moves in the inner cam groove 122b. If the webbing is further wound, as shown in FIG. 34(a), the guide pin 123a is pushed by a cam surface 142 of the notch portion 122d to thereby enter the outer cam groove 122a. At the same time, the operation mode switching lever 123 is made to swing counterclockwise (in the direction of the arrow $W_1$) in FIGS. 34(a) and 34(b). At this time, since the second lock convex portion 123f formed in the swinging end portion of the flexible arm portion 123e goes beyond the top S of the first lock convex portion 134, the direction of the repulsion between these first lock convex portion 134 and second lock convex portion 123f is changed so as to release the urging force of the operation mode switching lever 123 which acts the lock arm 124 in the direction where the lock arm 124 is engaged with the ratchet plate 4a.

The urging force of the torsion coil spring 138 makes the lock arm 124 swing in the direction where the engagement between the engagement portion 124a and the teeth of the ratchet plate 4a is released. Accordingly, only the emergency lock mechanism is left operated in the retractor, and the whole amount of the webbing is wound up. Thus, only the emergency lock mechanism is operated until the whole amount of the webbing is drawn out again and the guide pin 123a of the operation mode switching lever 123 is introduced into the inner cam groove 122b of the control plate 122. It is therefore possible to switch the operation mode from the emergency lock function to the automatic lock function by such an extremely simple operation that the whole amount of the webbing is drawn out.

That is, by the repulsion between the second lock convex portion 123f of the flexible arm portion 123e and the first lock convex portion 134 of the sensor cover 130, the operation mode switching lever 123 of the seat belt retractor urges the lock arm 124 in the direction where the lock arm 124 is engaged or is not engaged with the ratchet plate 4a. At the same time, the guide pin 123a of the operation mode switching lever 123 is engaged with the outer or inner cam groove 122a or 122b of the control plate 122 so as to be prevented from swinging unexpectedly.

For example, even if vibration, impact or the like acts on the operation mode switching lever 123 when the automatic lock mechanism is operated so that the second lock convex portion 123f would like to go over the top S of the first lock convex portion 134 unexpectedly, there is no fear that the direction of the urging force of the operation mode switching lever 123 does not change since the guide pin 123a engages with the inner cam groove 122b, and further there is no fear that the automatic lock state of the retractor is released.

Therefore, when a baggage, a child seat or the like is set on a seat by use of the webbing, there is no fear that the automatic lock state of the seat belt retractor is released by vibration, shock or the like so that the operation mode returns to the emergency lock state during the running of a vehicle. It is therefore possible to surely prevent the webbing from being gradually drawn out of the retractor during the running of the vehicle to thereby loosen the attachment of the baggage, the child seat or the like.

The members constituting the lock device driving mechanism or the operation mode switching device according to the present invention are not limited to those structures in the above-mentioned embodiments, and, but it is a matter of course that various modifications can be given to them. For example, although the repulsion between a first lock convex portion and a second lock convex portion is used for an urging device for urging the operation mode switching lever in the respective swinging directions, it is possible to use any other urging device having a structure using a spring member such as an over center spring, a compression spring or the like in which the direction of the urging force thereof changes suitably with a neutral position as a border.

Although an inertia detecting device is started up by the engagement of a lock arm with a ratchet plate in the present invention, it is, for example, possible to use such a configuration in which the lock arm is made to engage with a ratchet wheel so as to start up the inertia detecting device in accordance with the winding state of a webbing.

According to the seal belt retractor of the present invention, when almost the whole amount of a webbing has been drawn out, a guide pin of an operation mode switching lever is located in a switching area of a guide groove, so that the mode position of the operation mode switching lever can be switched only in one direction from the ELR mode side to the ALR mode side. Accordingly, there is no room to produce such an event that the operation mode returns unexpectedly, so that it is possible to switch the operation mode extremely accurately. In addition, in the seat belt retractor of the present invention, if the guide pin is set to be disposed in such a comparatively large switching area when the retractor is assembled, switching the operation mode can be ensured, so that it is also possible to improve the assembling property.

As described above, in the seat belt retractor according to the present invention, when a swinging end portion of an operation mode switching lever which is swingable between positions where an inertia detecting device is started up and not started respectively, engages with a first cam groove of a control plate, the operation mode switching lever is urged by an urging device to a position where the inertia detecting device is not started up. If the swinging end portion of the operation mode switching lever is moved to a second cam groove side of the control plate, the operation mode switching lever is urged by the urging device to a position where the inertia detecting device is started up.

That is, the inertia detecting device is operated in accordance with the winding state of a webbing. The operation mode switching lever of an operation mode switching device for moving a rotation lock device to a position where the rotation lock device engages with a winding shaft or a position where it does not engage with the same, is urged by the urging device to the position where the inertia detecting device is started up or the position where it is not started. At the same time, the swinging end portion of the operation mode switching lever engages with the first or second cam groove of the control plate so as to be prevented from swinging unexpectedly. Accordingly, there is no fear that the urging direction of the urging device for urging the operation mode switching lever is changed by vibration, impact, or the like, unexpectedly.

Therefore, for example, when the automatic lock mechanism is being operated, there is no fear that the urging direction of the urging device is changed unexpectedly by the effect of vibration, impact, or the like to thereby release the automatic lock state of the retractor.

It is therefore possible to provide a seat belt retractor superior in practical use in which an automatic lock mechanism is incorporated in an emergency lock retractor, and in which an operation mode switching device capable of switching its operation mode from the emergency lock function to the automatic lock function through a simple operation does not release the automatic lock function unexpectedly.

What is claimed is:

1. A retractor for a seat belt, comprising:

a base;

a sensor cover disposed on an outer portion of said base;

a ratchet plate including a winding shaft for winding a webbing, said winding shaft being rotatably fitted to said base;

a ratchet member rotatable in response to a rotation of said winding shaft in a webbing draw-out direction and including a pawl engaging said ratchet plate for locking the rotation of said winding shaft;

a lock arm rotatable between a first position where said lock arm engages with said ratchet plate and a second position where said lock arm does not engage with said ratchet plate;

a control plate rotated corresponding to the rotation of said winding shaft;

an operation mode switching lever having a flexible arm portion with a first swing end portion and a guide pin with a second swing end portion for rotating said lock arm to said first position and said second position, said guide pin being guided by a guide groove of said control plate, said guide groove including:

a first cam groove for guiding said guide pin so as to rotate said lock arm to said second position;

a second cam groove for guiding said guide pin so as to rotate said lock arm to said first position; and a switching area connecting an end point of said first cam groove to a start point of said second cam groove, and operated to deliver said guide pin to said second cam groove for switching said lock arm from said second position to said first position; and an urging means for urging said operation mode switching lever so as to rotate said lock arm to said first position and said second position, selectively, wherein said urging means comprises:

a first lock convex portion having a triangular section disposed on an inner wall of said sensor cover; and a second lock convex portion engaging said first lock convex portion and having a triangular section formed on said first swing end portion.

2. The retractor of claim 1, wherein said lock arm includes a guide member attached to said base, said lock arm being pivotably supported on said base through said guide member.

3. The retractor of claim 1, wherein said lock arm is pivotably supported on said ratchet member.

4. The retractor of claim 1, wherein said guide groove further includes:

a cam surface for switching said lock arm from said first position to said second position by which said guide pin reaching the end point of said second cam groove is guided onto a predetermined portion in said first cam groove; and a step portion provided on a border between said switching area and said first cam groove so that said guide pin is allowed to move from said first cam groove to said switching area while said guide pin is prevented from returning from said switching area to said first cam groove.

5. A retractor for a seat belt, comprising:

a base;

a sensor cover disposed on an outer portion of said base;

a rotation lock means for locking in a webbing draw-out direction a rotation of a winding shaft for winding a webbing;

a lock device driving mechanism for controlling said rotation lock means so as to form a lock state where the rotation in the webbing draw-out direction is prevented and an anti-lock state where the rotation in the webbing draw-out direction is allowed, selectively; and an operation mode switching means for switching an operation mode of said lock device driving mechanism between an emergency lock mode where said rotation lock means is set to said lock state in an emergency of a vehicle and an automatic lock mode where said rotation lock means is set to said lock state regardless of whether it is in the emergency or not, wherein said operation mode switching means includes:
  an operation mode switching lever attached pivotably between an emergency lock mode position for setting said emergency lock mode and an automatic lock mode position for setting said automatic lock mode, said operation mode switching lever including a flexible arm portion with a first end portion and a guide pin with a second end portion;
  a control plate rotating in interlocking with said winding shaft for controlling the pivot movement of said operation mode switching lever, said control plate including a guide groove for receiving said guide pin;
  a lock arm for bringing the operation mode of said lock device driving mechanism into said automatic lock mode; and an urging means for urging said operation mode switching lever into said emergency lock mode position and said automatic lock mode position, selectively, wherein said guide groove includes:
  a first cam groove for guiding said guide pin so as to maintain said operation mode switching lever in said emergency lock mode position;
  a second cam groove for guiding said guide pin so as to maintain said operation mode switching lever in said automatic lock mode position; and
  a switching area connecting an end point of said first cam groove to a start point of said second cam groove, and operated to deliver said guide pin to said second cam groove for switching the mode position of said operation mode switching lever from said emergency lock mode position to said automatic lock mode position, wherein said urging means comprises:
  a first lock convex portion having a triangular section disposed on an inner wall of said sensor cover; and
  a second lock convex portion engaging said first lock convex portion and having a triangular section formed on said first end portion.

6. The retractor of claim 5, wherein said guide groove further includes:
  a cam surface for switching the mode position of said operation mode switching lever from said automatic lock mode position to said emergency lock mode position by which said guide pin reaching the end point of said second cam groove is guided onto a predetermined portion in said first cam groove; and
  a step portion provided on a border between said switching area and said first cam groove so that said guide pin is allowed to move from said first cam groove to said switching area while said guide pin is prevented from returning from said switching area to said first cam groove.

7. The retractor of claim 5, wherein said lock arm includes a guide member attached to said base, said lock arm being pivotably supported on said base through a guide member.

* * * * *